US011392533B1

(12) United States Patent
Guo

(10) Patent No.: US 11,392,533 B1
(45) Date of Patent: Jul. 19, 2022

(54) SYSTEMS AND METHODS FOR HIGH-SPEED DATA TRANSFER TO MULTIPLE CLIENT DEVICES OVER A COMMUNICATION INTERFACE

(71) Applicant: CADENCE DESIGN SYSTEMS, INC., San Jose, CA (US)

(72) Inventor: Xiaolei Guo, Fremont, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/247,924

(22) Filed: Dec. 30, 2020

(51) Int. Cl.
G06F 13/42 (2006.01)
G06F 13/28 (2006.01)
G06F 13/16 (2006.01)
G06F 9/46 (2006.01)

(52) U.S. Cl.
CPC ........ *G06F 13/4282* (2013.01); *G06F 9/466* (2013.01); *G06F 13/1642* (2013.01); *G06F 13/28* (2013.01); *G06F 13/4221* (2013.01); *G06F 2213/0026* (2013.01)

(58) Field of Classification Search
CPC .. G06F 13/4282; G06F 13/28; G06F 13/4221; G06F 13/1642; G06F 9/466; G06F 2213/0026
USPC ......... 710/5, 11, 12, 16, 29, 36, 38, 62, 105, 710/305
See application file for complete search history.

(56) References Cited

U.S. PATENT DOCUMENTS

| | | | | |
|---|---|---|---|---|
| 5,535,229 A * | 7/1996 | Hain, Jr. | ............ | H04B 7/18523 714/49 |
| 2004/0049797 A1* | 3/2004 | Salmonsen | ............. | G06F 13/40 725/132 |
| 2005/0102456 A1* | 5/2005 | Kang | .................. | G06F 13/4031 710/113 |
| 2006/0015673 A1* | 1/2006 | Morrow | ................ | G06F 13/387 710/315 |
| 2010/0195512 A1* | 8/2010 | Harvey | ................... | H04L 41/22 370/252 |
| 2011/0078349 A1* | 3/2011 | Ushigami | ............... | G06F 13/28 710/105 |
| 2012/0265912 A1* | 10/2012 | Hess | ..................... | G06F 9/4411 710/301 |
| 2013/0166801 A1* | 6/2013 | Chun | .................. | G06F 13/4059 710/110 |

\* cited by examiner

*Primary Examiner* — Idriss N Alrobaye
*Assistant Examiner* — Henry W Yu
(74) *Attorney, Agent, or Firm* — Foley & Lardner LLP

(57) ABSTRACT

A device may include a plurality of first communication interfaces configured to communicate with a plurality of external client devices, a second communication interface configured to communicate with an external master device, a third communication interface configured to communicate with an external first device, and a first controller. The second communication interface may perform a one-to-many communication with the plurality of first communication interfaces over a first protocol. The third communication interface may communicate with the plurality of first communication interfaces or the second communication interface via the first controller over a second protocol that is different from the first protocol.

20 Claims, 16 Drawing Sheets

SYSTEMS AND METHODS FOR HIGH-SPEED DATA TRANSFER TO MULTIPLE CLIENT DEVICES OVER A COMMUNICATION INTERFACE

TECHNICAL FIELD

This application is generally directed towards processor-based emulation systems, and more specifically towards providing an interface device via which one or more master devices can communicate with a plurality of client devices over a communication interface, such as a serial peripheral interface (SPI).

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs. A significant function of the EDA tools is emulation of a user's logical system (e.g., an IC design) to perform pre-silicon functional verification, firmware and software development, and post-silicon debug. To achieve this, a typical processor-based emulation system comprises several Application Specific Integrated Circuits (ASICs), often referred to as emulation ASICs or emulation chips, all working together to execute a program generated by an emulation compiler generated from the user's IC design. The compiled program models a design under test (DUT) that is a logical representation of the user's IC design running on several emulation ASICs of the emulation system.

Emulation ASICs may communicate with each other via communication links, such as copper traces carrying data in a circuit board or optical cables carrying data across circuit boards. The communication links often carry serialized data, although the data may be generated and/or consumed in parallel. Therefore, an input/output (I/O) communication interface at a transmit side serializes parallel data prior to transmission and another I/O communication interface at a receive side parallelizes received serial data. An SPI is an I/O communication interface that serializes parallel data, transmits serialized data, receives serialized data, and parallelizes the received data.

Two or more devices (for example, emulation ASICs or any other electronic devices) may use their corresponding SPIs for communication. For instance, a master emulation ASIC having a corresponding SPI master may communicate with a client (or slave) emulation ASIC having a corresponding SPI client (or slave) using the SPI master and the SPI client. The SPI master may control the SPI client such that the SPI master may initiate communication with the SPI client. In some cases, the SPI master may need to perform one-to-many communication with a plurality of SPI clients. There is need for efficiently performing one-to-many communication over a SPI protocol. In some cases, an emulation system include one or more devices that use non-SPI protocols, for example, peripheral component interconnect express (PCIe). Devices using different interface protocols may have different communication speeds from each other. There is need for efficiently processing communication between devices using different interface protocols.

SUMMARY

Embodiments of the present disclosure relate to system and method for providing an interface device via which one or more master devices can communicate with a plurality of client devices over a communication interface in an emulation system.

In an embodiment, a device, via which an external master device, a plurality of external client devices, and an external first device are communicated with one another, may include a plurality of first communication interfaces configured to communicate with the plurality of external client devices, a second communication interface configured to communicate with the external master device, a third communication interface configured to communicate with the external first device, and a first controller. The second communication interface may be configured to perform a one-to-many communication with the plurality of first communication interfaces over a first protocol. The third communication interface may be configured to communicate with the plurality of first communication interfaces or the second communication interface via the first controller over a second protocol that is different from the first protocol.

In another embodiment, a method for communicating between an external master device, a plurality of external client devices, and an external first device via an interface device which includes a plurality of first communication interfaces, a second communication interface, a third communication interface and a first controller, may include communicating, by the plurality of first communication interfaces, with the plurality of external client devices. The method may include communicating, by the second communication interface of the interface device, with the external master device. The method may include communicating, by a third communication interface of the interface device, with the external first device. The method may include performing, by the second communication interface, a one-to-many communication with the plurality of first communication interfaces over a first protocol. The method may include communicating, by the third communication interface, with the plurality of first communication interfaces or the second communication interface via the first controller over a second protocol that is different from the first protocol.

BRIEF DESCRIPTION OF THE DRAWINGS

The accompanying drawings constitute a part of this specification and illustrate an embodiment of the subject matter described herein.

DETAILED DESCRIPTION

Figure 1:
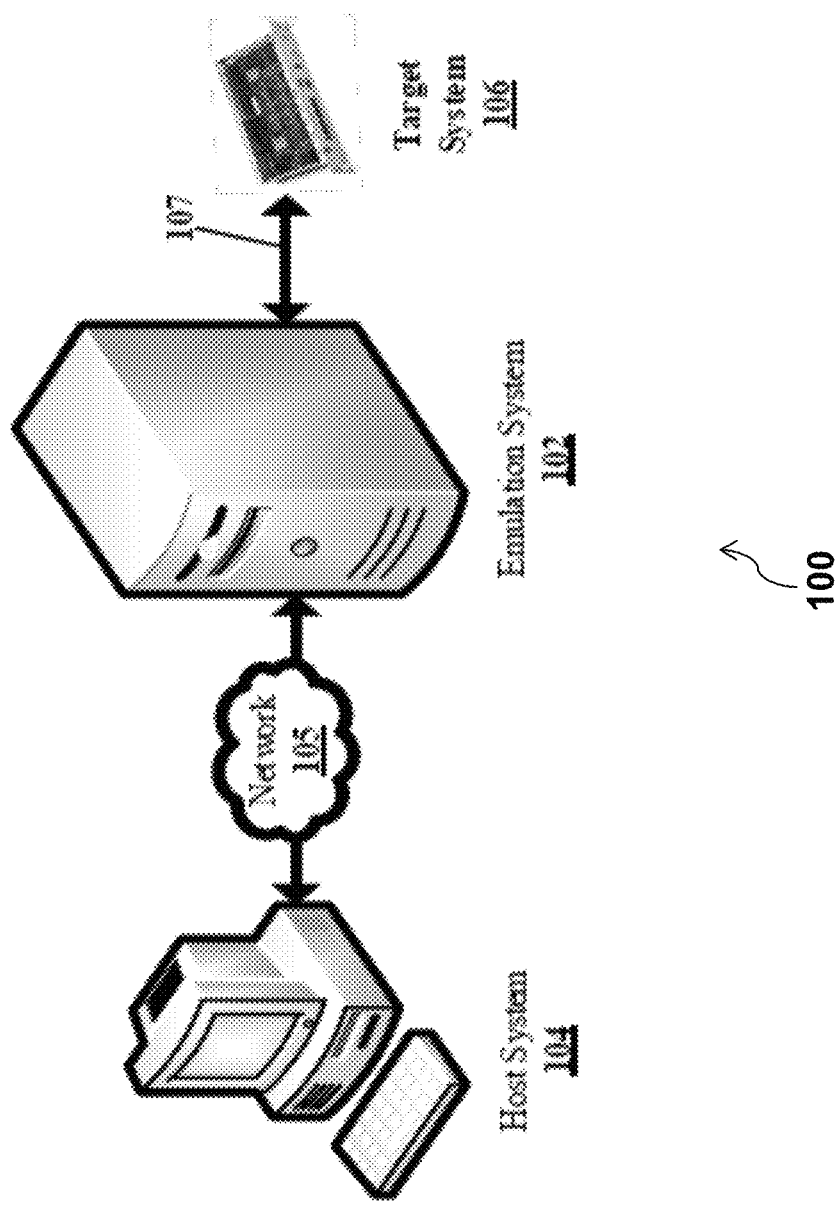
FIG. 1 shows an illustrative environment including an emulation system, according to some embodiments.

Embodiments disclosed herein describe an interface device of an emulation system (e.g., SCI field programmable gate array (FPGA)). Via the interface device, an external master device (e.g., ASICs with SPI), a plurality of external client devices (e.g., ASICs with SPI), and an external first device (e.g., an ASIC with a PCIe interface) are communicated with one another. The interface device may include a plurality of first communication interfaces (e.g., SPI masters) configured to communicate with the plurality of external client devices, a second communication interface (e.g., SPI client) configured to communicate with the external master device, a third communication interface (e.g., non-SPI interface; PCIe interface) configured to communicate with the external first device, and a first controller. The second communication interface (e.g., SPI client) may be configured to perform a one-to-many communication with the plurality of first communication interfaces (e.g., SPI masters) over a first protocol (e.g., SPI). The third communication interface may be configured to communicate with the plurality of first communication interfaces or the second communication interface via the first controller over a second protocol that is different from the first protocol (e.g., PCIe). At least one of the plurality of first communication interfaces (e.g., SPI masters) may include (1) a burst read buffer dedicated for performing burst read from the third communication interface (e.g., PCIe interface) by the at least one first communication interface, and (2) a burst write buffer dedicated for burst write to the at least one first communication interface by the third communication interface.

In an emulation system, two or more devices (for example, emulation ASICs or any other electronic devices) may use corresponding SPIs thereof for communication. For instance, a master emulation ASIC having a corresponding SPI master may communicate with a client emulation ASIC having a corresponding SPI client using the SPI master and the SPI client. The SPI master may control the SPI client such that the SPI master may initiate communication with the SPI client. In some cases, the SPI master may need to perform one-to-many communication with a plurality of SPI clients. There is need for efficiently performing one-to-many communication over a SPI protocol.

To solve this problem, according to certain aspects, implementations in the present disclosure relate to techniques for providing a single interface device that enables one-to-many communication between a single SPI master device and multiple SPI client devices over SPI at a faster speed (>100 MHz, for example). For example, an interface device according to some embodiments may be an SCI FPGA supporting 38 homogeneous SPI client (slave) devices each running at 100 MHz with 32-bit address and 64-bit data, and one SPI master device running at less than 10 MHz with 32-bit address and 32/64-bit data. In some embodiments, an interface device may include an SPI client, a plurality of SPI masters, and a non-SPI interface, respectively communicating an external SPI master device, a plurality of external SPI client devices, and an external non-SPI controller. In some embodiments, an interface device may include a dedicated internal control bus (e.g., control bus between register access 440, arbiter controller, SPI client, SPI masters, and non-SPI client; see FIGS. 6, 7 and 9), thereby allowing back-door access/diagnostics/control of each SPI master. In some embodiments, an interface device may perform per SPI master interface queuing and flow control using, for example, round-robin arbitration logics with dedicated read/write FIFO buffers. In some embodiments, an SPI master of the interface device may perform access arbitration, protocol conversion between SPI and non-SPI, read/write status auto-polling, and hardware assisted master-client (slave) linkup training. In some embodiments, auto-status polling can be performed using a timer such that upon timeout, software can set an abort signal to allow the arbitration logic to skip status polling. In this manner, the arbitration logic can complete a read/write transaction without software intervention. In some embodiments, a SPI master may provide control and status registers thereof for diagnostic/normal operations. Similarly, a SPI client may provide control and status registers thereof for diagnostic/normal operations. A SPI client may provide register-based control over a dedicate control bus (e.g., control bus between register access 440, arbiter controller, SPI client, SPI masters, and non-SPI client; see FIGS. 6, 7 and 9). In some embodiments, control and status registers of all SPI clients and SPI masters can be accessible via a central arbiter or a central controller (e.g., register access 440; see FIG. 9).

Another problem is related to an emulation system including one or more devices that use non-SPI protocols, for example, PCIe. Devices using different interface protocols may have different communication speeds from each other. There is need for efficiently processing communication between devices using different interface protocols.

To solve this problem, according to certain aspects, implementations in the present disclosure relate to techniques accommodating heterogeneous client devices with SPI or Non-SPI interface at various speeds with different address/data bus widths. In some embodiments, to allow a host device to communicate with such client device over SPI and/or other protocol interfaces such as PCIe and Secure Digital Input Output (SDIO). In some embodiments, an interface device may include a non-SPI interface configured to communicate with one PCIe Gen 2 controller with 32-bit address and 32/64-bit data. In some embodiments, a single interface device may include or support multiple user control interfaces including SPI and other non-SPI interfaces (e.g., PCIe and SDIO). In some embodiments, the interface device may include a protocol convert and arbiter block (e.g., translation 1040 of RAM buffer pool 450) that converts read/write requests from a SPI master device and non-SPI controller into an internal bus format, and arbitrates accesses to various targets (internal and external) downstream through individual interface controllers thereof. In some embodiments, an SPI master of the interface device may include dedicated read and write buffers, thereby buffering and pipelining read/write transactions for communication with faster non-SPI interfaces such as PCIe. In this manner, the SPI master of the interface device can initiate burst read/write transactions while improving SPI client (slave) link utilization. SPI masters can provide (1) a burst read interface controller, (2) a burst write interface controller, and (3) a debug access interface controller, so that each interface can generate internal read/write requests independently. The debug access interface controller (or debug access controller) of a SPI master may be connected to an internal control bus (e.g., control bus between register access 440, arbiter controller, SPI client, SPI masters, and non-SPI client; see FIGS. 6, 7 and 9), thereby allowing both external SPI master device and external non-SPI controller to not only send single read/write request bypassing a central arbiter, but also run native SPI instructions over the associated SPI link. In some embodiments, a non-SPI interface can run PCIe and SDIO protocol and cause the interface device to convert external read/write requests into internal bus format (such as Advanced eXtensible Interface 4 (AXI4)). For example, a SPI client can convert external read/write requests into internal bus format (such as AXI4-Lite) using a translation module of a RAM buffer pool (e.g., translation 1040 of RAM buffer pool 450; see FIG. 10). In some embodiments, the interface device may provide a clock domain crossing logic, thus allowing all external interfaces to run at their own asynchronous clocks.

In some embodiments, an external master device, a plurality of external client devices, and an external first device are communicated with one another via a device. The device may include a plurality of first communication interfaces configured to communicate with the plurality of external client devices, a second communication interface configured to communicate with the external master device, a third communication interface configured to communicate with the external first device, and a first controller. The second communication interface may be configured to perform a one-to-many communication with the plurality of first communication interfaces over a first protocol. The third communication interface may be configured to communicate with the plurality of first communication interfaces or the second communication interface via the first controller over a second protocol that is different from the first protocol. At least one of the plurality of first communication interfaces may include (1) a burst read buffer dedicated for performing burst read from the third communication interface by the at least one first communication interface, and (2) a burst write buffer dedicated for burst write to the at least one first communication interface by the third communication interface. The at least one first communication interface may include (1) a burst read interface controller configured to buffer and pipeline burst read transactions using the burst read buffer, and (2) a burst write interface controller configured to buffer and pipeline burst write transactions using the burst write buffer.

The first protocol may be an SPI protocol. The second protocol may be PCIe or SDIO.

The first controller may be configured to communicate with at least one of the plurality of first communication interfaces, the second communication interface, or the third communication interface. The first controller may be configured to convert a read/write request received from one of the second communication interface or the third communication interface into an internal bus format. The first controller may be configured to arbitrate accesses between the plurality of first communication interfaces, the second communication interface, and the third communication interface.

The plurality of first communication interfaces may be configured to send a read/write request to at least one of the second communication interface or the third communication interface, bypassing the first controller. At least one of the plurality of first communication interfaces may include a debug access controller.

The first controller may include at least one read/write buffer configured to perform queuing and flow control per first communication interface. In some embodiments, each of the plurality of first communication interfaces, the second communication interface, and the third communication interface may include a respective control and status register. The plurality of first communication interfaces, the second communication interface, and the third communication interface may be configured to access a control and status register of each other via the first controller.

First, embodiments in the present disclosure can provide useful techniques for providing an SCI via which a SPI master device, a non-SPI master device and a plurality of SPI client (or slave) devices can efficiently communicate with other, by providing SPI masters of the SCI which are connected to the SPI client devices and include dedicated burst read (RSCTL), burst write (WSCTL), and debug access (RWCTL) interface controllers. The SPI masters may include dedicated read and write buffers for the dedicated RSCTL controller and the dedicated burst write (WSCTL) controller. With the dedicated controllers and buffers of each SPI master, the SPI masters can be prevented from being overrun by a non-SPI interface of the SCI having faster speed than the SPI masters. Moreover, the SPI masters can maximize SPI link utilization by buffering and pipelining PCIe initiated burst read/write transactions.

Second, embodiments in the present disclosure can provide useful techniques for providing queuing and flow control per SPI master, thereby maximize SPI link utilization. For example, the SCI may include round-robin arbitration logics in various controllers (e.g., RAM buffer pool 450 and buffer manager 460; see FIGS. 10 and 11), providing queuing and flow control for synchronous FIFOs provided per SPI master (e.g., synchronous FIFOs 790; see FIGS. 7, 10 and 11).

Third, embodiments in the present disclosure can provide useful techniques for supporting external host controllers with protocols other than SPI, for example, PCIe or SDIO, integrating various kinds of interface protocols in an SPI-based switched control interface.

FIG. 1 shows an illustrative environment 100 of an emulation system, according to an embodiment.

The illustrative environment 100 may include an emulation system 102, a host system 104, a network 105, a target system 106, and a connection 107. The host system 104 may include one or more workstations that may run debug and runtime software interacting with the emulation system 102. The workstations may computing devices, such as desktop computers, laptop computers, tablet computers, and smartphones.

The emulation system 102 may include a combination of hardware and software modules, which may emulate a DUT. The emulation system 102 may include clusters of interconnected ASICs, non-transitory memory devices, buffers, data storage devices configured to provide a system platform for emulating the DUT. The clusters may be arranged in multiple boards. The boards may be arranged within multiple racks. Multiple racks may be arranged in a plurality of emulation devices, which may be analogous to multi-rack servers.

The target system 106 may include hardware modules configured to interact with the DUT being emulated. The target system 106 may include software modules configured to interact with the DUT being emulated. For example, if the DUT is a design of a graphics processing unit (GPU), the target system 106 may be a motherboard configured to receive the GPU after fabrication. The target system 106 may be an external hardware environment provided by a user.

The network 105 may be a communication link facilitating communication between the host system 104 and the emulation system 102. For example, the network 105 may include a local area network (LAN), a metropolitan area network (MAN), a wide area network (WAN), and/or Internet. The connection 107 may be a communication link configured to facilitate a communication with the emulation system 102 and the target system 106.

The above described systems 102, 104, 106 of the environment 100 are merely illustrative and other configuration should be considered to be within the scope of this disclosure. For example, the network 105 may include the connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 105 using a remote access protocol, such as internet protocol (IP).

Figure 2:
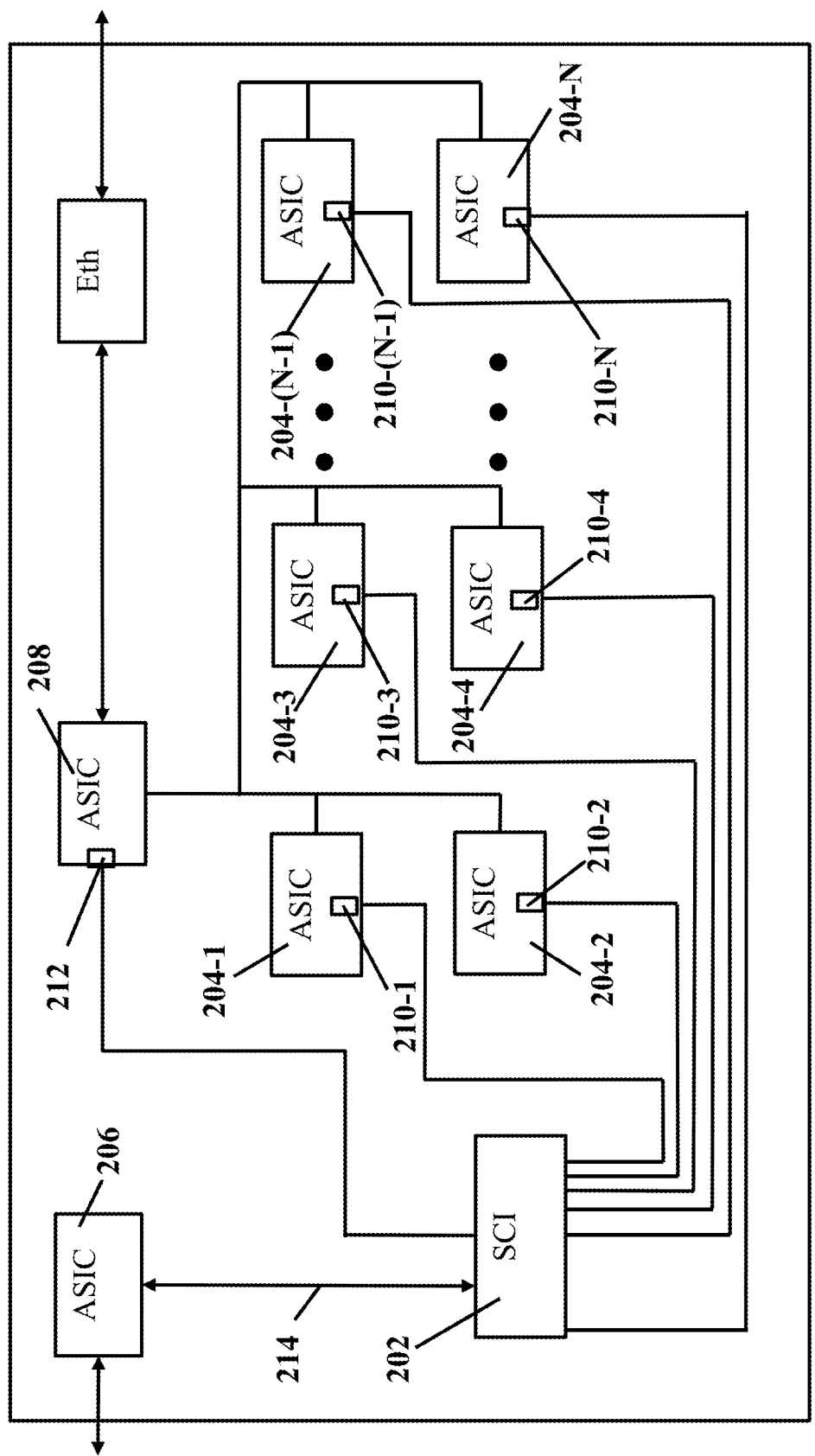
FIG. 2 shows an architecture of an emulation system having one or more SPI masters and one or more SPI clients, according to some embodiments.

FIG. 2 shows an architecture 200 of an emulation system having one or more SPI masters and one or more SPI clients, according to some embodiments.

The emulation system may include a SCI 202, multiple switching ASICs 204, a first ASIC 206, such as blue field (BF) ASIC, and a second ASIC 208, such as board manager (BM) ASIC. The first ASIC 206 and the second ASIC 208 may coordinate with each other as both the first ASIC 206 and the second ASIC 208 may write to the same register at any time.

The emulation system may further include one or more SPI clients 210 associated with the multiple switching ASICs 204. The one or more SPI clients 210 may support programmable address and data widths. In one non-limiting example, each SPI client 210 may support the programmable address and data widths from 8 to 64 bits respectively. The emulation system may include a SPI master 212 associated with the second ASIC 208. The SPI master 212 may support programmable address and data widths. In one non-limiting example, the SPI master 212 may support the programmable address and data widths from 8 to 64 bits respectively. The emulation system may further include a PCIe 214 associated with the first ASIC 206.

A function of the SCI 202 is to provide the first ASIC 206 and the second ASIC 208 access to the multiple switching ASICs 204 via their corresponding SPIs. The PCIe may have a faster speed and may receive burst access requests from the first ASIC 206, and accordingly the SCI 202 may implement a flow control protocol to prevent the SPIs associated with the multiple switching ASICs 204 from being overrun by the PCIe 214. In some embodiments, the SCI 202 may be an FPGA. The SCI FPGA 202 may include one or more reference input clocks. The SCI FPGA 202 may implement one or more types of reset commands, which may reset logics within each module of the SCI FPGA. A first reset command may be useful to reset a SCI FPGA core logic. A second reset command may be useful to reset and restart individual SPI linkup.

The SPI master 212 may determine one or more communication parameters. The SPI master 212 may access and program one or more hardware registers associated with the one or more SPI clients 210 with the one or more communication parameters. In some instances, the one or more SPI clients 210 may receive the one or more communication parameters from the SPI master 212, and the one or more SPI clients 210 may configure the one or more hardware registers with the one or more communication parameters. The one or more communication parameters may include a predetermined time interval associated with periodic pinging operation executed by the SPI master 212. The one or more communication parameters may further include a programmable wait time associated with receiving a response from the one or more SPI clients 210. The one or more communication parameters may further include a programmable time with respect to a whole transaction framing associated with transmission of a response from the one or more SPI clients 210. The one or more communication parameters may further include address bus width and data bus width associated with memory within the one or more SPI clients 210. The one or more communication parameters may further include a predetermined sampling rate associated with the one or more SPI clients 210 to ensure reliable data capture. The one or more communication parameters may further include a transmission start time associated with the one or more SPI clients 210. The one or more communication parameters may further include a data output delay time associated with the one or more SPI clients 210 to ensure reliable data capture.

The SPI master 212 may send read and write transaction requests to the one or more SPI clients 210. For each such transaction request, the SPI master 212 may receive an acknowledgment message from the one or more SPI clients 210 based on the one or more communication parameters. The SPI master 212 may periodically ping the one or more SPI clients 210 based on the one or more communication parameters until the SPI master 212 may receive the acknowledgment message from the one or more SPI clients 210. The acknowledgment message may include a first response (transaction successfully completed), a second response (transaction is pending), a third response (read/write protocol error such as issuing a read request while a write request is pending and vice versa), or a fourth response (invalid acknowledgment codes).

Figure 3:
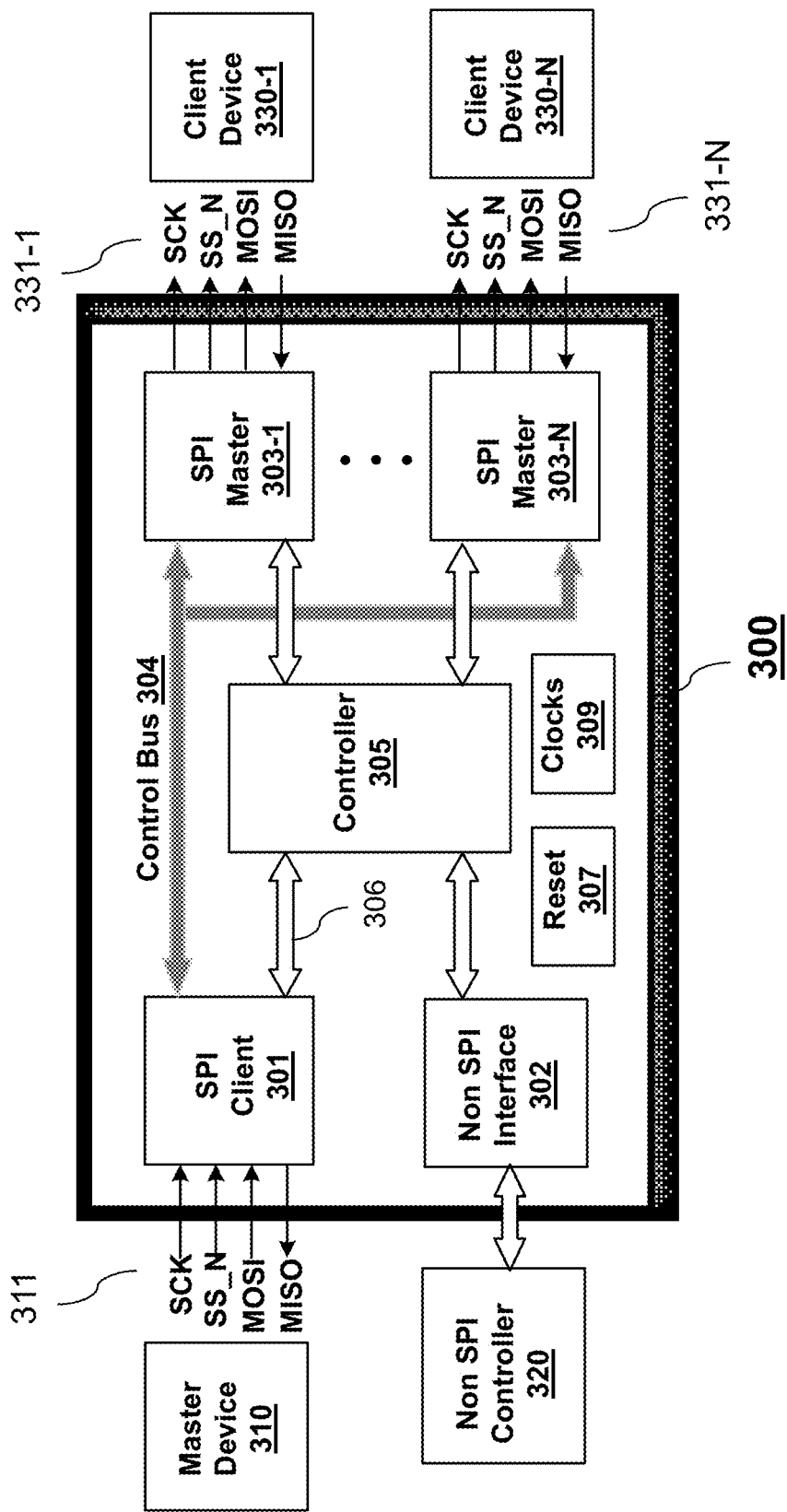
FIG. 3 is a schematic diagram depicting an example of a switched control interface (SCI) in an emulation system, according to some embodiments.

FIG. 3 is a schematic diagram depicting an example of an SCI 300 in an emulation system, according to some embodiments.

In some embodiments, one or more external master device 310, a plurality of SPI client (or slave) devices 330-1 to 330-N (N≥1) (as a plurality of external client devices), and one or more non-SPI controller 320 (as an external first device) may be communicated with one another via an SCI 300 (as an interface device).

The interface device 300 may include a plurality of SPI masters 303-1 to 303-N (as a plurality of first communication interfaces) configured to communicate with the plurality of external client devices (e.g., ASICs 204-1 to 204-N in FIG. 2), one or more SPI clients 301 (as a second communication interface) configured to communicate with the external master device 310 (e.g., ASIC 206 in FIG. 2), one or more non-SPI interface 302 (as a third communication interface) configured to communicate with the external first device 320, and a controller 305 (as a first controller). The interface device 300 may include one or more clocks 309 and one or more resets 307. In some embodiments, the one or more clocks 309 include a system clock or a PCIe clock. In some embodiments, the one or more resets 307 may include a system reset configured to reset everything of the interface device, a SCI core reset, or a SDIO reset.

Figure 6:
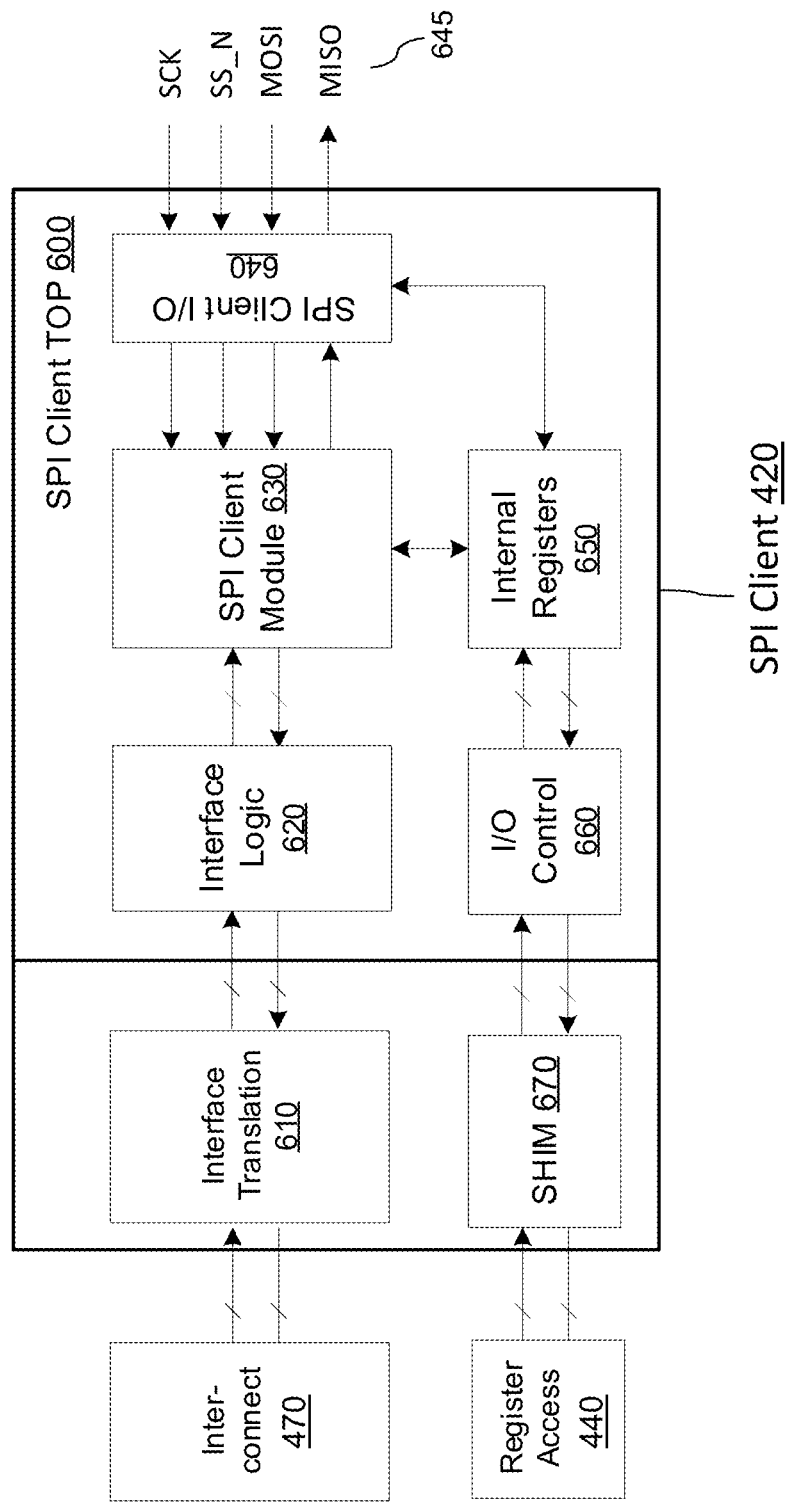
FIG. 6 is a schematic diagram depicting a SPI Client of an SCI in an emulation system, according to some embodiments.
Figure 7:
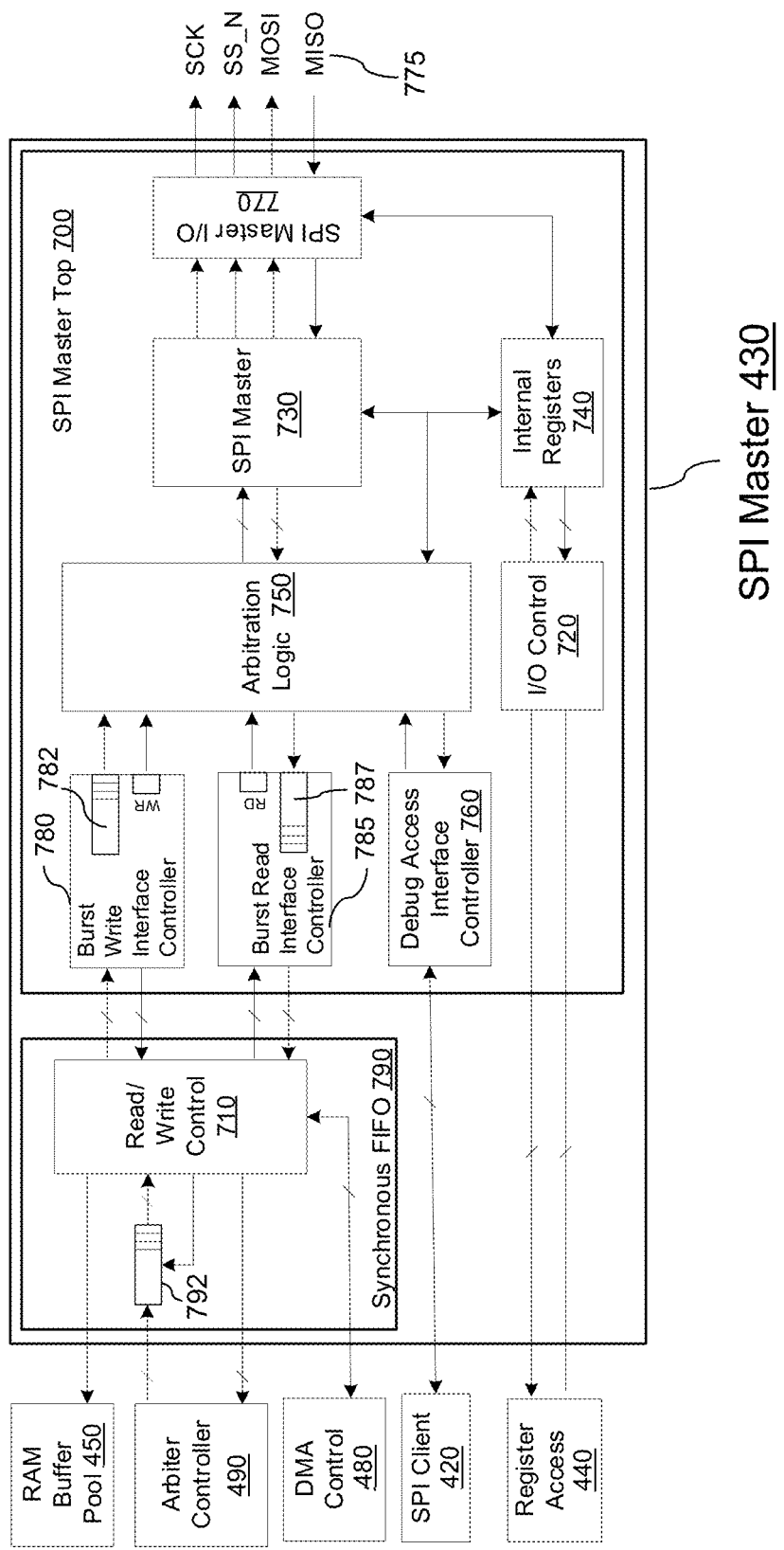
FIG. 7 is a schematic diagram depicting a SPI master of an SCI in an emulation system, according to some embodiments.
Figure 9:
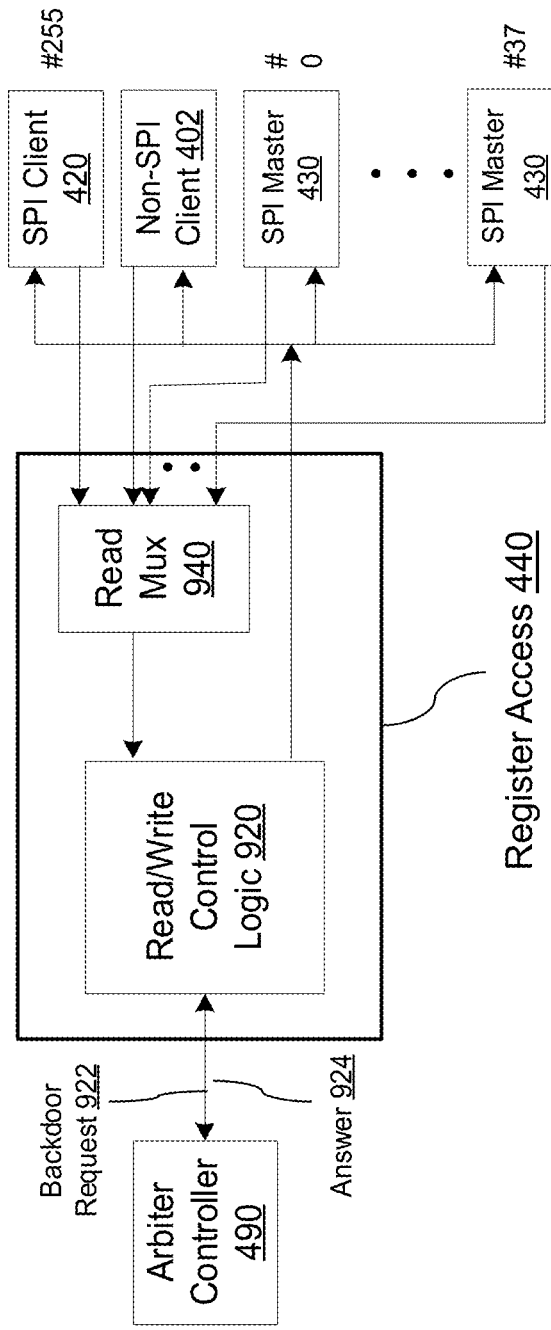
FIG. 9 is a schematic diagram depicting a register access of an SCI in an emulation system, according to some embodiments.

The second communication interface 301 may be configured to perform a one-to-many communication with the plurality of first communication interfaces 303-1 to 303-N via a control bus 304 (e.g., control bus between register access 440, arbiter controller, SPI client, SPI masters, and non-SPI client; see FIGS. 6, 7 and 9) over a first protocol. In some embodiments, the first protocol may be an SPI protocol. The second communication interface 301 may be connected to the external master device 310 using lines 311 including SCK, MOSI, MISO, and SS-N lines. In some embodiments, the first controller 305 may include at least one read/write buffer configured to perform queuing and flow control per first communication interface 303.

The third communication interface 302 may be configured to communicate with the plurality of first communication interfaces 330-1 to 330-N or the second communication interface 301 via the first controller 305 over a second protocol that is different from the first protocol. In some embodiments, the second protocol may be PCIe or SDIO.

The first controller 305 may be configured to communicate with at least one of the plurality of first communication interfaces 303-1 to 303-N, the second communication interface 301, or the third communication interface 302 via an internal bus 306 that is different from the control bus 304 (e.g., control bus between register access 440, arbiter controller, SPI client, SPI masters, and non-SPI client; see FIGS. 6, 7 and 9). The first controller 305 may be configured to convert a read/write request received from one of the second communication interface 301 or the third communication interface 302 into an internal bus format. The first controller 305 may be configured to arbitrate accesses between the plurality of first communication interfaces 303-1 to 303-N, the second communication interface 301, and the third communication interface 302.

The plurality of first communication interfaces 303-1 to 303-N may be configured to send a read/write request to at least one of the second communication interface or the third communication interface, bypassing the first controller. At least one of the plurality of first communication interfaces may include a debug access controller. Each of the first communication interfaces 303-1 to 303-N may be may be connected to corresponding external client devices 330-1 to 330-N using corresponding lines 331-1 to 331-N each including SCK, MOSI, MISO, and SS-N lines.

Each of the plurality of first communication interfaces 303-1 to 303-N, the second communication interface 301, and the third communication interface 302 may include a respective control and status register. The plurality of first communication interfaces, the second communication interface, and the third communication interface may be configured to access a control and status register of each other via the first controller 305.

Figure 4:
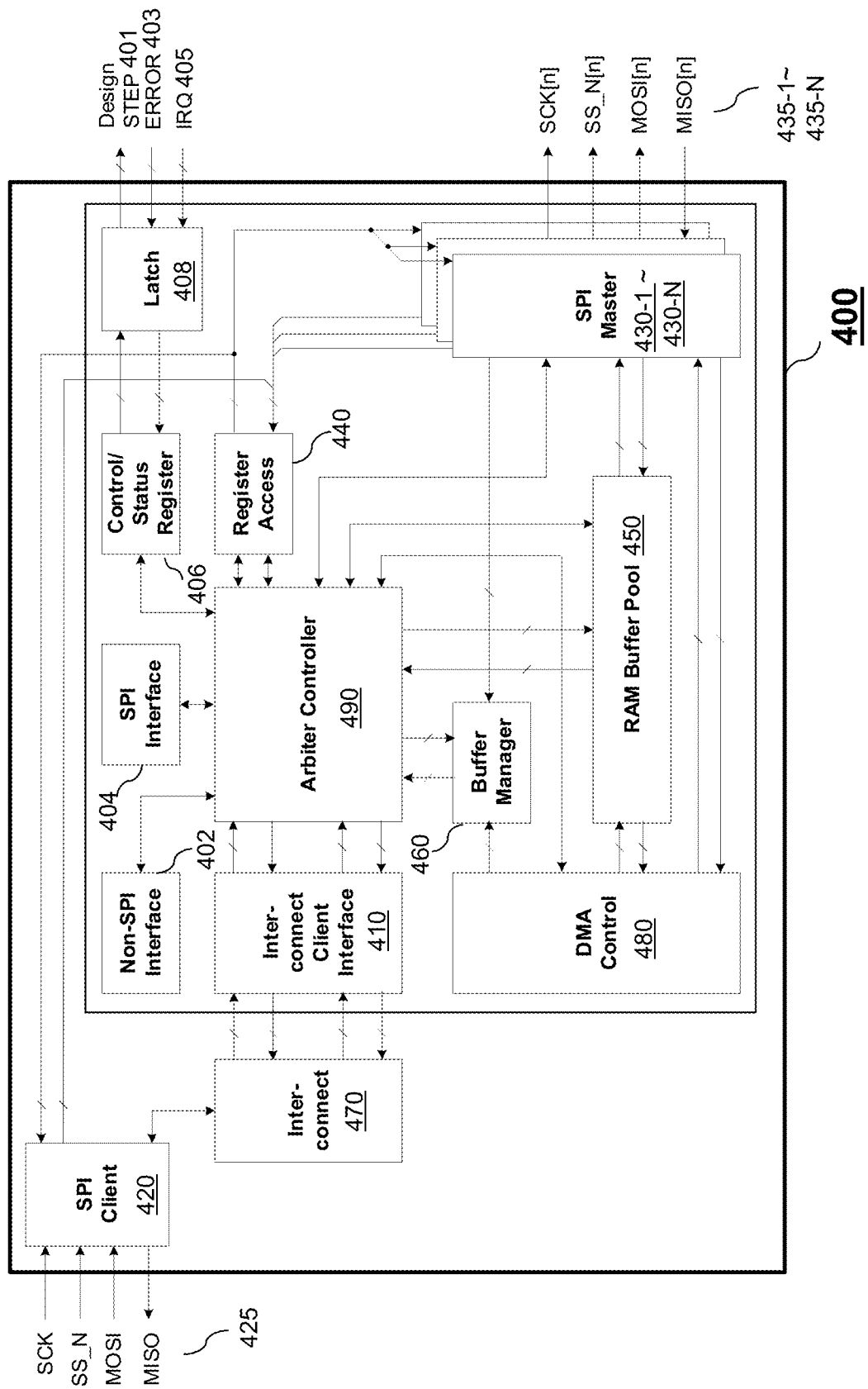
FIG. 4 is a schematic diagram depicting another example of an SCI in an emulation system, according to some embodiments.

FIG. 4 is a schematic diagram depicting another example of an SCI 400 in an emulation system, according to some embodiments.

An SCI 400 may include an interconnect client (or slave) interface 410, an SPI client (or slave) 420, a plurality of SPI masters 430-1 to 430-N, a register access 440, a RAM buffer pool 450, a buffer manager 460, a non-SPI interface 402, an SPI interface 404, a control/status register 406, a latch 408, an interconnect 470, a direct memory access (DMA) control 480, and an arbiter controller 490.

The interconnect client interface 410 may be configured to communicate between the interconnect 470 and the arbiter controller 490. In some embodiments, the SPI client 420 may be connected to an external master device (e.g., external master device 310 in FIG. 3) using lines 425 including SCK, MOSI, MISO, and SS-N lines. In some embodiments, each of the plurality of SPI masters 430-1 to 430-N may be connected to corresponding external client devices (e.g., external client devices 330-1 to 330-N in FIG. 3) using corresponding lines 435-1 to 435-N each including SCK, MOSI, MISO, and SS-N lines. In some embodiments, the register access 440 may handle or process a backdoor access to the SPI masters 430-1 to 430-N (e.g., N=38) and an access to an internal register of the SPI client 420. The RAM buffer pool 450 may implement a buffer pool shared by components of SCI 400. The buffer manager 460 may convert read/write requests (e.g., AXI read/write requests) into an internal bus format so that the arbiter controller 490 can arbitrate accesses to various target devices (internal and external) downstream through their individual interface controllers. The interconnect client interface 410, the SPI client 420, the plurality of SPI masters 430, the register access 440, the RAM buffer pool 450, and the buffer manager 460 will be described below in detail with reference to FIGS. 5, 6, 7, 9, 10, 11, respectively.

The non-SPI interface 402 may be a PCIe interface. For example, the non-SPI interface 402 may include an AXI memory mapped to a PCIe interface that supports 2×5 GT/s PCIe Gen 2 links to a BF ASIC. In some embodiments, the non-SPI interface 402 may include three AXI master interfaces upstream. Accesses to an external client device are "posted" when DMA mode is enabled, otherwise they are directed, which is the default mode in some embodiments. In some embodiments, the PCIe interface may direct each of PCIe read/write requests to an external client device by using a paging control register in the SCI 400 to form a 32-bit SPI address. In some embodiments, to expedite PCIe transactions, the PCIe interface may always post AXI writes, regardless of their targets. However, the PCIe interface may always directing AXI read accesses to devices other than external client devices, e.g., the initiator needs to wait for explicit acknowledgement from its target to complete a transaction, while not always directing AXI read accesses to external client devices. For example, by enabling DMA mode (using DMA control 480), PCIe interface (e.g., non-SPI interface 402 in FIG. 4) may post accesses to an external device bypassing arbitration logics (e.g., arbitration logics implemented by arbiter controller 490, buffer manager 460, RAM buffer pool 450) such that the initiator does not need to wait for explicit acknowledgement from its target to complete a transaction.

The SPI interface 404 may support a programming FPGA PROM or a SPI flash memory. In some embodiments, the control/status register 406 may implement control and status registers for generating a DMA request under software control. In some embodiments, the latch 408 may be configured to latch each client device's IRQ 405 and ERROR status output 403 and forward them to both the DMA control 480 and the control/status register 406 for logging. In some embodiments, the latch 408 may be configured to provide design step signals to one or more independent step generators (e.g., two independent step generators) under control of the control/status register 406.

The interconnect 470 may be an AXI interconnect. For example, the interconnect 470 may be configured with three AXI slave interfaces upstream and one AXI master interface downstream (32-bit address and 64-bit data). In some embodiments, the DMA control 480 may receive a DMA request (e.g., from the control/status register 406) and send an acknowledge to the request. In some embodiments, the DMA control 480 may use a round-robin arbitration scheme to select next active request.

The arbiter controller 490 may be responsible for directing each request from the interconnect client interface 410 to its addressed target. In some embodiments, for writes, the arbiter controller 490 may move a block of data from a write data buffer of a component (e.g., interconnect client interface 410 or SPI master 430) into an allocated memory space from the RAM buffer pool 450. For reads, the arbiter controller 490 may move a block of data into a read data buffer of a component from an allocated memory space from the RAM buffer pool 450. In some embodiments, the arbiter controller 490 may forward a request to the interconnect client interface 410 and then wait for the completion of the request. During this period, the arbiter controller 490 may relay signals both ways between the interconnect client interface 410 and the target.

Figure 5:
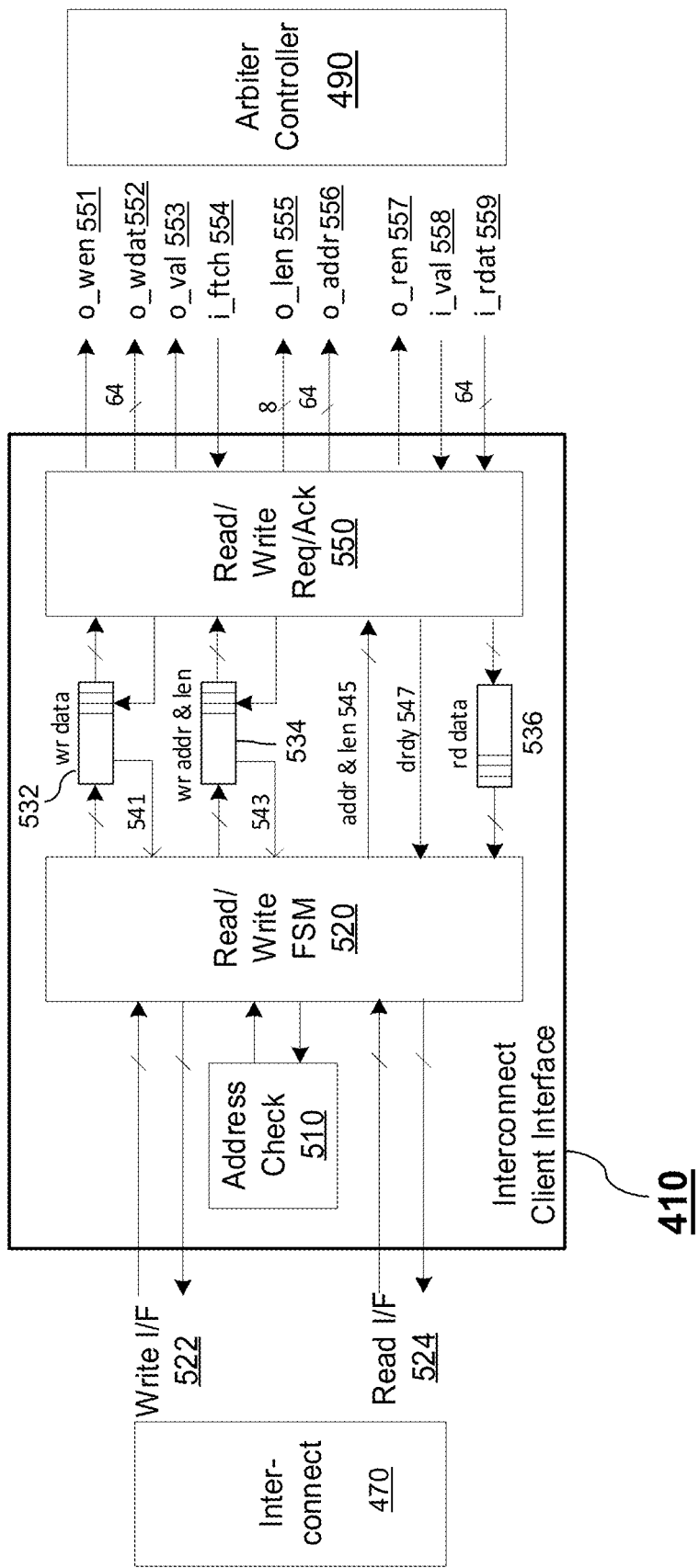
FIG. 5 is a schematic diagram depicting an interconnect client interface of an SCI in an emulation system, according to some embodiments.

FIG. 5 is a schematic diagram depicting an interconnect client interface 410 of an SCI in an emulation system, according to some embodiments.

In some embodiments, the interconnect client interface 410 may be configured to communicate between the interconnect 470 and the arbiter controller 490. In some embodiments, the interconnect client interface 410 may include an address check 510, a read/write finite state machine (FSM) 520, buffers 532, 534, 536, and a read/write request/acknowledge interface logic 550. In some embodiments, the interconnect client interface 410 may be an AXI slave interface to the interconnect 470, supporting AXI write and read transactions with 32-bit address and 64-bit data and a maximum burst of 256 thus 2 KB data. In some embodiments, the interconnect client interface 410 may be connected to the interconnect 470 using a write interface 522 and/or a read interface 524. In some embodiments, the interconnect client interface 410 may be connected to the arbiter controller 490 using lines including o_wen 551, o_wdat 552, o_val 553, i_ftch 554, o_len 555, o_addr 556, o_ren 557, i_val 558, and/or i_rdat 559.

The interconnect client interface 410 may terminate write transactions (e.g., AXI write transactions) without waiting for acknowledgement from its clients. The interconnect client interface 410 may implement such a "posted" transaction with two buffers—the write data buffer 532 and the write address buffer 534 (for address and length (e.g., burst size)). The read/write FSM may determine, based on a signal 543 that the address buffer is full, and wait till the flag is cleared; otherwise, it may latch address and burst size and check for errors. For example, errors may include AXI protocol errors such as unsupported size (only 64-bit and 32-bit are supported) or unsupported burst type (only INCR type is supported). In some embodiments, the address check 510 may validate the address such that any address undefined in the current memory map is considered invalid. If the address is valid, the interconnect client interface 410 may save the address with burst length in the write address buffer 534.

The read/write FSM 520 may determine, based on a signal 541 that the write data buffer 532 is full, and wait till the flag is cleared; otherwise, it may toggle a ready signal (not shown), save or write each data bit with proper flags in the data buffer, update its local bit count, tag the first and last bits of data with start-of-packet (SOP) and end-of-packet (EOP) flags asserted separately and any bit(s) of data in-between with both flags cleared. After all data are saved or written, the interconnect client interface 410 may generate a proper response (e.g., AXI response) and with error status if applicable). In some embodiments, if the address is not valid, the interconnect client interface 410 may still go through the same procedure except that no address nor data will be saved in the buffers, which effectively drops the request. Meanwhile, as soon as the first data bit (SOP=1) is saved in the buffer, the interconnect client interface 410 may generate an internal write request (e.g., o_wen=1), together with burst length (e.g., o_len), write address (e.g., o_addr), write data (e.g., o_wdata) and data valid (e.g., o_val) and send it to the arbiter controller 490. In some embodiments, the arbiter controller or any of its clients downstream may be able to fetch write data from the buffer by toggling a read control signal (e.g., i_ftch). The write request may be cleared upon the last data buffer read. In some embodiments, the interconnect client interface 410 may always complete a write transaction (e.g., an AXI write transaction) regardless of it being valid or not. Each of the write data buffer 532 and the write address buffer 534 may be implemented in 512×72 synchronous FIFO so that the interconnect client interface 410 can accept a maximum of two 2 KB write bursts or 512 single writes. In some embodiments, interconnect client interface 410 may not need to be aware whether current transaction will use DMA or non-DMA (direct) mode or not because it needs to wait for explicit acknowledgement from its clients in order to complete each transaction.

The interconnect client interface 410 may handle or process a read transaction with the read data buffer 536. The read/write FSM 520 may latch address, burst size and check for errors. In some embodiments, errors may include AXI protocol errors such as unsupported size (only 64-bit and 32-bit may be supported) or unsupported burst type (only INCR type may be supported). Meanwhile, the address check 510 may validate the address such that any address undefined in the current memory map is considered invalid. If the address is valid, the interconnect client interface 410 may generate an internal read request (e.g., o_ren=1), together with a signal 545 including burst length (e.g., o_len) and read address (e.g., o_addr), and send the request to the arbiter controller 490. The arbiter controller 490 may direct the request to a target. In some embodiments, in a non-DMA mode, the target may respond eventually by returning read data (e.g., i_rdat) and data valid (e.g., i_val). However, in the DMA mode, the arbiter controller 490 may return dummy read data. The read/write request/acknowledge interface logic 550 may track or check the number of data bits in return and save them in the read data buffer 536. As long as the interconnect 470 is ready for receiving data and the read data buffer is not empty, the interconnect client interface 410 may fetch-then-forward the read data to the interconnect 470.

Once forwarding the last read data, the interconnect client interface 410 may clear the current request. Once detecting an internal data ready signal 547, the interconnect client interface 410 may initiate and complete a read data transfer (e.g., an AXI read data transfer) by emptying the read data buffer 536 and sending the data to the interconnect 470. If an input address (e.g., AXI input address) is not valid, the interconnect client interface 410 may simply drop the request by returning a dummy data pattern and completing the required burst transfer. In some embodiments, no downstream read request may be generated in this case. In some embodiments, the read data buffer 536 may be implemented in 512×72 synchronous FIFO so that the interconnect client interface 410 can accommodate a maximum of two 2 KB read bursts or 512 single reads.

The interconnect client interface 410 may perform error detection and generate responses (e.g., AXI responses). For both read and write transactions, if the address is not valid, the interconnect client interface 410 may generate an error response (e.g., AXI DECERR response). For example, a 32-bit full address may be considered invalid if its bits [31:24] are not zeros or it falls into predetermined reserved spaces in a memory map. For write transactions, any other errors such as invalid burst size/type (e.g., AXI burst size/type), write strobe, write data count mismatch (with expected burst size) and/or FIFO write errors may result in a SLVERR in response. For read transactions, any other errors such as invalid AXI burst size/type and read data count mismatch (with expected burst size) will also result in generating an unsuccessful transaction response (e.g., AXI SLVERR response).

SPI masters 430 and RAM buffer pool 450 may support burst access. In some embodiments, any burst access intended for other modules, such as register access 440, non-SPI interface 402, SPI interface 404, and/or control/status register 406 may still be completed in compliance with an interconnect protocol (e.g., AXI protocol) and so is every access with invalid address within each block (invalid reads normally return with dummy data).

FIG. 6 is a schematic diagram depicting a SPI Client 420 of an SCI in an emulation system, according to some embodiments.

The SPI client 420 may be configured to support 32-bit address and 64-bit data at a system side (e.g., SCI side). In some embodiments, both the non-SPI interface 402 and the SPI interface 404 support 32-bit data only, and in this case, SPI client 420 may support 32-bit data read/write over 64-bit data bus. In some embodiments, the SPI client 420 may include interface translation 610, a SHIM layer 670, and a SPI client top 600. The SPI client top 600 may include an interface logic 620, an SPI client module 630, an SPI client I/O 640, internal registers 650, and I/O control 660.

The interface translation 610 may be connected to the interconnect 470, and configured to translate an internal system bus interface into a master interface (e.g., AXI master interface (single access only)). The interface translation 610 may handle or process domain-crossing between the two interfaces. In some embodiments, the internal registers 650 may include an SPI auxiliary control and status register (e.g., AUX), an SPI general purpose output register (e.g., GCTL), and an SPI general purpose input register (e.g., GSTO). For example, GCTL and GSTO may provide commands and status for debugging SPI masters (see FIG. 7).

The SHIM layer 670 may be connected to the register access 440. The SHIM layer 670 may be configured to add a required logic without changing the existing interface logic 620 so that the register access 440 can broadcast each read/write request with an SPI interface identifier encoded in the request signal structure. In some embodiments, the SHIM layer 670 may read/write data from/to the internal registers 650 via the I/O control 660.

The SPI client I/O 640 may be connected to an external master device using lines 645 including SCK, SS_N, MOSI, and MOSO lines. In some embodiments, the SPI client I/O 640 may implement FPGA related I/O registers and I/O delay primitives.

FIG. 7 is a schematic diagram depicting a SPI master 450 of an SCI in an emulation system, according to some embodiments.

A SPI master 430 may include a SPI master top 700 and synchronous FIFO 790. The SPI master top 700 may include an I/O control 720, an SPI master module 730, internal registers 740, an arbitration logic 750, a debug access interface controller 760, an SPI master I/O 770, a burst write interface controller 780, and a burst read interface controller 785.

The SPI master module 730 may implement an SPI master interface that connects to an SPI interface of an external client device (e.g., ASICs 204 or client devices 330-1 to 330-N in FIG. 3). In some embodiments, the SPI master module 730 may support programmable address and data width from 8 to 64 bits separately. In some embodiments, the SPI master module 730 may provide at the system side (e.g., SCI side) a generic request/acknowledge interface that allows various devices (e.g., master device 310 or non-SPI device 320 in FIG. 3) to send their instruction/address/data to an external client device and return response data from the external client device to the various devices.

The SPI masters 430-1 to 430-N (see FIG. 4) may each implement an SPI master interface to an external client device (e.g., ASIC) in a SPI master top sub-module (e.g., SPI master top 700 in FIG. 7), which provides internally three separate system interfaces: the debug access interface controller 760 (RWCTL), the burst write interface controller 780 (WSCTL), and the burst read interface controller 785 (RSCTL). In some embodiments, the debug access interface controller 760 may perform a back-door read/write (single access). The burst write interface controller 780 may have an internal buffer 782 and the burst read interface controller 785 may have an internal buffer 787, so that the SPI master can handle one active read and one active write requests simultaneously at the system side (e.g., SCI side). In this manner, to pipeline burst read/write transactions, the SPI master top 700 can provide dedicated burst read (RSCTL), burst write (WSCTL), and debug access (RWCTL) interface controllers such that each interface generates internal read/write requests independently.

Figure 8A:
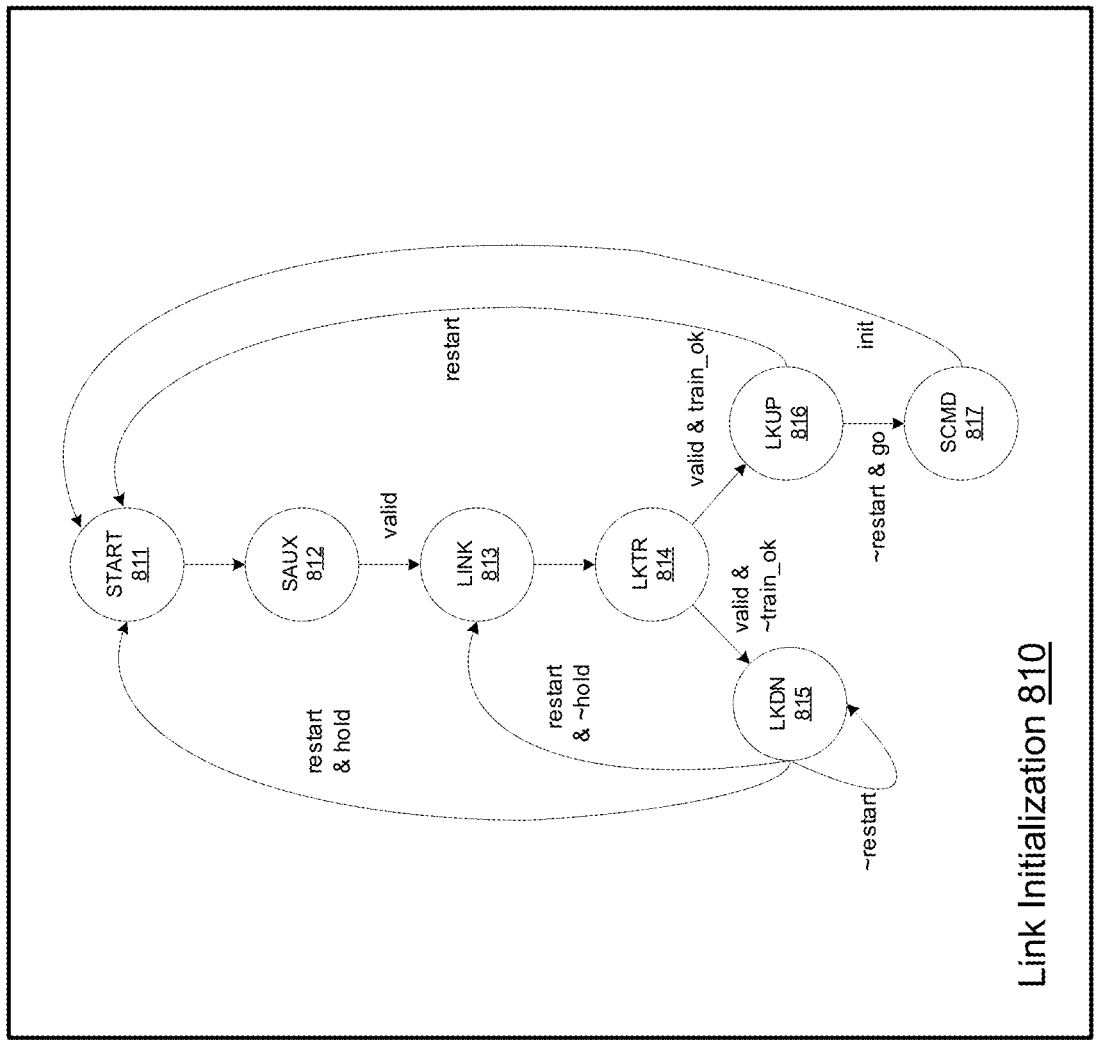
FIG. 8A is a control state diagram of link initialization of a SPI master of an SCI in an emulation system, according to some embodiments.
Figure 8B:
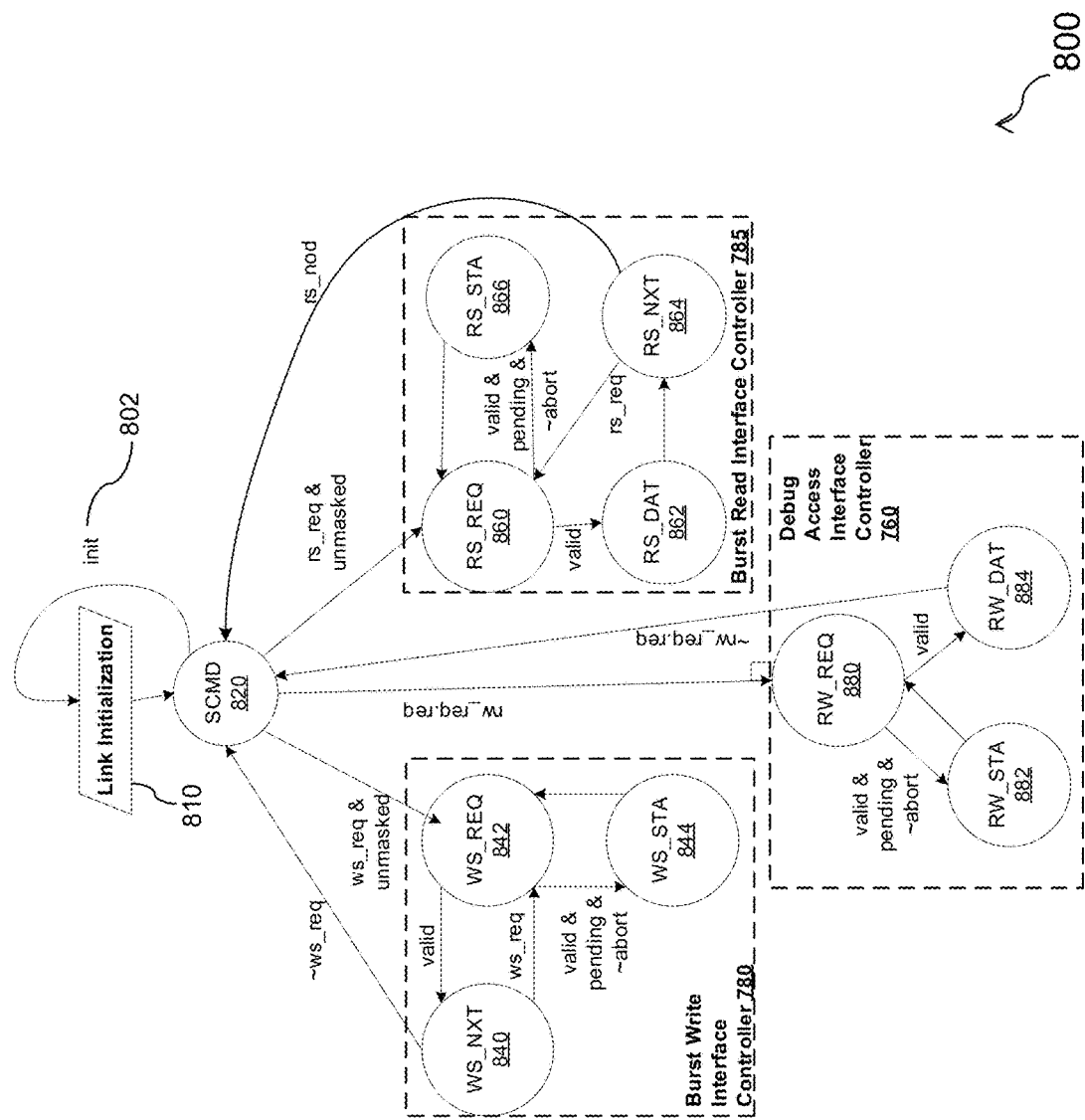
FIG. 8B is a control state diagram of normal operations of a SPI master of an SCI in an emulation system, according to some embodiments.

The arbitration logic 750 may implement control state machines as shown in FIG. 8A and FIG. 8B. For example, referring to FIG. 8A and FIG. 8B, after performing link initialization 810, the arbitration logic 750 may be configured to cause the burst read interface controller 785 (RSCTL), the burst write interface controller 780 (WSCTL) and the debug access interface controller 760 (RWCTL) to generate and manage three individual requests, such as rs_req, ws_req and rw_req.req, respectively. When there is no active request, the arbitration logic 750 may stay in an idle state (e.g., SCMD state 820 in FIG. 8B). In some embodiments, when all of the three requests are active at the same time, the arbitration logic 750 may serve or process the WSCTL first, then the RSCTL, followed by the RWCTL. In some embodiments, the arbitration logic 750 can force or cause the state machine to re-start link initialization by asserting an init signal 802 (see FIG. 8B), which is useful to bring up an SPI link to an individual external client device (e.g., ASIC chip) after its reset without affecting the other external client devices being accessed through the SCI 400.

The SPI master I/O 770 may be connected to an external client device using lines 775 including SCK, SS_N, MOSI, and MOSO lines. In some embodiments, the SPI master top 700 may be connected to a SPI client 420 and the register access 440 so that the register access 440 can access the internal registers 740 via the I/O control 720.

The synchronous FIFO 790 may be connected to the RAM buffer pool 450, the DMA control 480, and the arbiter controller 490. The synchronous FIFO 790 may include a read/write control 710 and a FIFO queue 792. In some embodiments, for any access to the synchronous FIFO 790 except for non-DMA read, the arbiter controller 490 may obtain a free pointer first from the buffer manager 460. For writes, the arbiter controller 490 may first move a block of data from a write data buffer of the interconnect client interface 410 into an allocated memory space from the RAM buffer pool 450. The arbiter controller 490 may then re-generate the request with the allocated pointer, full address (including page address bits), burst length and send it to the synchronous FIFO 790. When the arbiter controller 490 could not obtain a pointer, it may drop the request; for writes, it may still move (or drain) the block of data from a buffer of the interconnect client interface 410 but may not generate any writes to the RAM buffer pool 450; for reads, the arbiter controller 490 may generate dummy response back to the interconnect client interface 410 in order to complete an AXI read transaction.

The synchronous FIFO 790 may first buffer read and write requests from the arbiter controller 490 using synchronous FIFO. For example, the FIFO can accommodate a maximum of 512 requests, which is more than the total number of pointers (e.g., 256), thus resulting in no overflow or write error (a write to a full buffer).

When a busy signal for WSCTL=0 and the request is a write request, the synchronous FIFO 790 may (1) latch the request, which includes address, write pointer and burst length; (2) forward the address and burst length information to the WSCTL; (3) generate a RAM read request to the RAM buffer pool 450; when granted, fetch write data one by one from the buffer starting at the pointer, then forward them to the WSCTL; when forwarding the last write data, also generate an end-of-record (eor) flag; return the write pointer to the buffer manager 460 for reuse.

The read logic of the synchronous FIFO 790 may support DMA and non-DMA (or direct) modes. In the DMA mode, when a busy signal for RSCTL=0 and the request is a read request, the synchronous FIFO 790 may (1) latch the request, which includes address, read pointer and burst length; (2) forward the address and burst length information to the RSCTL; (3) wait for acknowledgement from the RSCTL; (4) once acknowledged, generate a RAM write request to the RAM buffer pool 450; when granted, fetch read data one by one from the RSCTL buffer and save them in the RAM starting at the read pointer; after saving the last read data, generate a DMA request which includes the read pointer and data size (i.e., burst length).

In the direct mode, when a busy signal for RSCTL=0 and the request is a read request, the synchronous FIFO 790 may (1) latch the request, which includes address and burst length; (2) forward the address and burst length information to the RSCTL; (3) wait for acknowledgement from the RSCTL; (4) once acknowledged, fetch read data from the RSCTL buffer and return them one by one to the interconnect client interface 410 to complete the transaction.

Both read and write completion status including error(s), together with number of queued request(s) in the buffer, may be forwarded to the DMA control 480 where they may be logged on a per client basis. In some embodiments, SPI master interface may run off system clock, the synchronous FIFO 790 may runs off an interface clock (e.g., AXI interface clock). The domain-crossing may be handled via the asynchronous FIFOs in both WSCTL and RSCTL modules.

The debug access interface controller 760 (RWCTL) may serve as the debug interface controller for the SPI master top 700. RWCTL may take a common command input from an SPI general purpose output register (e.g., GSTL register) of the SPI master top 700 and provide completion status back to an SPI general purpose input register (e.g., GSTO register) of the SPI master top 700. In some embodiments, the GCTL register may (1) allow a BM, for example, to select one of N×SPI master tops (e.g., N=38) as target; (2) set debug mode, which reserve SPI address of the SPI master top 700 and write data registers as its address and write data input to the RWCTL; (3) set SPI instruction of its choice; and enable (activate) the command. Meanwhile, the GSTO register may allow the BM to check each command's execution status, together with client response status, for example. In some embodiments, once done using the RWCTL, software may need to clear the GCTL register for normal operations.

FIG. 8A is a control state diagram of performing link initialization (control logic) 810 of a SPI master of an SCI in an emulation system, according to some embodiments.

The SPI link initialization (control logic) 810 may include three steps: 1) input timing check, 2) link training, and 3) configuration, which apply to both SPI master and SPI client. Referring FIG. 8A, where restart, hold, go, init may be register bits (all default to 0); valid (=1) may be an internal indication of receiving client's response (and data); train_ok (=1) may be an internal indication of the client's response from a train instruction (e.g., <TRAIN> instruction) matching a predetermined bit pattern.

Initially, the link may be down and the control logic 810 may stay in START state 811 upon reset. Once reset is de-asserted, the control logic 810 may issue a configuration write instruction (e.g., <CFG_WRITE3> instruction) with client's output delay setting sourced from an internal register, send it to the SPI master as shown in FIG. 7 and move to SAUX state 812 waiting for client's response. Once receiving the client's response, the control logic 810 may move to LINK state 813. When in the LINK state, the control logic 810 may issue a train instruction (e.g., <TRAIN> instruction), send it to the SPI master and move to LKTR state 814 waiting for client's response as well as train results. When in the LKTR state 814 and receiving the client response (valid=1), if train_ok=1 (PASS), the control logic 810 may move to LKUP state 816 waiting for software instruction(s). The main reason for not going to the SCMD state 817 automatically is to allow the system to adjust I/O timing at both sides (master and client) before starting normal operations. For any adjustment, software may modify relevant register settings as explained below with LKDN state 815 then set the restart to 1. By detecting restart=1 while in the LKUP state 816, the control logic 810 may return to the START state 811 and repeat the above steps.

When final adjustment(s) are done and validated by going through the above steps and back to the LKUP state 816, software can clear the restart bit and set the go bit to 1. Upon seeing go=1 while in the LKUP state 816, the control logic 810 may move to the SCMD state 817 and clear the link down signal. In some embodiments, both control state and link status may be logged in an auxiliary register allowing software to poll them in real time.

If train_ok=0 (FAIL), the control logic 810 may move to LKDN state 815, where it also waits for software instruction(s). Once in the LKDN state 815, there may be two user options. First, the user can repeat the train instruction (e.g., <TRAIN> instruction) by setting restart to 1 while keeping hold at 0. The control logic 810 may move back to the LINK state 813, re-issue a train instruction towards the SPI master and re-check the results.

If the train instruction keeps failing, the control logic may return to the LKDN state 815 while the link is still down, which indicates among multiple factors input timing at least needs to be investigated, (re-)checked and/or adjusted. This could involve board level checks as well. From inside the SCI FPGA, (1) input delay and (2) sampling can be adjusted so can be the client's output delay settings The final step for both adjustments (1)-(2) may be to set the hold bit to 1 while keeping the restart at 1, upon which while in the LKDN state 815, the control logic 810 may return to the START state 811 and start from the beginning with new settings. Once the link is up and the control logic is in the SCMD state 817, the last step to enable the SPI interface may be to select SPI mode, data width, address width, SPI_ACK delay, parity (optional) and CRC (optional) for both sides.

FIG. 8B is a control state diagram of normal operations of a SPI master of an SCI in an emulation system, according to some embodiments. FIG. 8B shows an arbitration logic 800 (as state machine) represented by control states.

For each read/write transaction requests forwarded via the SPI master (e.g., SPI master 430) to a client chip (e.g., ASICs 204 in FIG. 2), there may be four possible responses in general: (1) OK (transaction completed successfully); (2) PEND (transaction pending); (3) RWERR (read/write protocol error such as issuing a read while a write is pending and vice versa); (4) ACKERR (invalid acknowledgement codes).

For PEND cases, a 16-bit saturate counter may be used to track visits to each of RS_STA state 866, WS_STA state 844, and RW_STA state 882 before returning to SCMD (idle) 820. Software can monitor this count or its saturate status and declare a time-out if it crosses a threshold (selected by software and stored in software space) or simply saturated. Upon a time-out, software can set an abort signal to allow the state machine 800 to skip status polling and complete the transactions as normal.

Corresponding mask signals for the RSCTL and WSCTL may be set to allow running some diagnostics via the RWCTL, for instance. When rs_req=1 (active) and it is not masked, the arbitration logic 800 may generate a read instruction (e.g., <READ> instruction), send it to the SPI master module (e.g., SPI master module 730) and move to RS_REQ state 860 waiting for client's response. If receiving a read PEND and the abort signal is not set, the arbitration logic 800 may move to RS_STA state 866, update the visit counter, generate a read status instruction (e.g., <READ STATUS> instruction), send it to the SPI master module before coming back to the RS_REQ state 860. If receiving a read ACK, the arbitration logic 800 may forward the read data to RSCTL (which may save it in its data buffer) and move to RS_DAT state 862 then RS NXT state 864. If receiving a read PEND with the abort signal asserted, the arbitration logic 800 may skip the RS_STA state 866 and proceed to the RS_DAT 862 as "normal". If receiving a RWERR or ACKERR, the arbitration logic 800 may log the error and proceed to RS_DAT 862 as "normal".

When in the RS NXT state 864, if the RSCTL indicates no more read request with rs_nod=1, the arbitration logic 800 may go back to the SCMD state 820, otherwise, the RSCTL should hold its request line, e.g., rs_req=1, and the arbitration logic 800 may generate a read next instruction (e.g., <READ NEXT> instruction), send it to the SPI master before returning to the RS_REQ state 860. When ws_req=1 (active) and it is not masked, the arbitration logic 800 may generate a write instruction (e.g., <WRITE> instruction), send it to the SPI master module and move to WS_REQ state 842 waiting for client's response. If receiving a write PEND and the abort signal is not set, the arbitration logic 800 may move to WS_STA state 844, update the visit counter, generate a write status instruction (e.g., <WRITE STATUS> instruction), and send it to the SPI master before coming back to the WS_REQ state 842. If receiving a write ACK, the arbitration logic 800 may move to WS_NXT state 840. If receiving a write PEND with the abort signal asserted, the arbitration logic 800 may skip the WS_STA 844 and proceed to the WS_NXT 840 as "normal". If receiving a RWERR or ACKERR, the arbitration logic 800 may log the error and proceeds to WS_NXT state 840 as "normal".

When in the WS_NXT state 840, if the WSCTL indicates no more read request with ws_req=0, the arbitration logic 800 may go back to the SCMD state 820, otherwise, the arbitration logic 800 may fetch next write data from the WSCTL's data buffer, generate a write next instruction (e.g., <WRITE NEXT> instruction), send it to the SPI master before returning to the WS_REQ state 842.

Likewise, when rw_req.req=1 (active), the arbitration logic 800 may forward RWCTL's instruction to the SPI master and move to RW_REQ state 880 waiting for client's response. Depending on the type of instruction it forwarded, if receiving a read or write PEND and the abort signal is not set, the arbitration logic 800 may move to RW_STA state, otherwise, it may move to RW_DAT state 884 waiting for the RWCTL to clear its request since RWCTL supports single access only. When in the RW_STA state, the arbitration logic 800 may send a read status (e.g., <READ STATUS> instruction) or a write status instruction (e.g., <WRITE STATUS> instruction) to the SPI master corresponding to the current pending transaction (read/write).

With auto-status polling and the abort signal cleared (default), the arbitration logic 800 may always complete a read/write transaction without software intervention. In some embodiments, the WSCTL module may have a 4 KB buffer implemented in asynchronous FIFO and support a maximum burst write of 4 KB. Likewise, the RSCTL module may have a 4 KB buffer and supports a maximum burst read of 4 KB. Both RSCTL and WSCTL may run independently of each other and they each can process one request at a time from the synchronous FIFO 790. Anytime when RSCTL and WSCTL are processing a request, they may assert a busy signal (for WSCTL and RSCTL) informing the synchronous FIFO 790. In some embodiments, the synchronous FIFO 790 is not allowed to send a new read request when a busy signal for RSCTL=1 (XOFF signal) or a new write request when a busy signal for WSCTL=1 (XOFF signal).

When the WSCTL empties its data buffer by completing all the writes or when the RSCTL completes all the reads by collecting all the read data in its buffer, they may clear their XOFF signals and return explicit acknowledgement with error status if applicable.

FIG. 9 is a schematic diagram depicting a register access 440 of an SCI in an emulation system, according to some embodiments.

The register access 440 may handle or process a backdoor access to the SPI masters 430-1 to 430-N (e.g., N=38) and an access to an internal register of the SPI client 420. In some embodiments, the register access 440 may handle or process single access requests from SPI masters, including back-door access to both the SPI client and the SPI masters. In some embodiments, each of the SPI client and the SPI masters may include 8×64-bit registers (expandable to 32 registers if needed). In some embodiments, the register access 440 may define an allocated memory space with 24 bits among which (1) upper 8 bits [23:16] are used for block or region level decode thus each block or region is 64K bytes in size; (2) middle 8 bits [15:8] are used for SPI interface identifies (e.g., 0 . . . 37 for identifying 38 SPI masters); and (3) lower 8 bits are used for an backdoor address space (256 bytes).

The register access 440 may include a read/write control logic 920 and a read mux 940 (or read multiplexer). In some embodiments, the read/write control logic 920 may be configured to receive a backdoor request 922 from the arbiter controller 490 and provide an answer 924 to the arbiter controller 490.

The register access 440 may complete each read/write transaction as in compliance with AXI protocol (e.g., AXI4 protocol). In some embodiments, although the register access 440 does not support burst write or burst read, for an unsupported burst write, the read/write control logic 920 may the register access 440 may execute on the first write data only and discard the rest; and for a burst read, the read/write control logic 920 may execute a "single" read from the addressed location then repeat the data for the rest of the burst. In some embodiments, the register access 440 may complete each single/burst access with invalid address. For writes the register access 440 may drain a write data buffer, while for reads it may return dummy data. For debug purpose, the register access 440 may have a register for logging each transaction.

The read/write control logic 920 may be configured to send read/write control signals or write signals to at least one of (1) the SPI client 420, (2) the non-SPI client 402, or (3) the plurality of SPI masters 430-1 to 430-N (for example, N=38). The read mux 940 may be configured to receive data from at least one of (1) the SPI client 420 or (2) the plurality of SPI masters 430-1 to 430-N. In some embodiments, for normal single access, the read/write control logic 920 may generate corresponding read/write control signals downstream. Write signals may be broadcast to the SPI client 420, the non-SPI 402, and the plurality of SPI masters because each of them can self-identify the access request by comparing the address [15:8] bits of write control signals against its own identifier and respond accordingly. Read signals from each target may be multiplexed by the mux 940 and combined externally before being fed into the read access 400. The read/write control logic 920 may return read data to the interconnect client interface 410.

Figure 10:
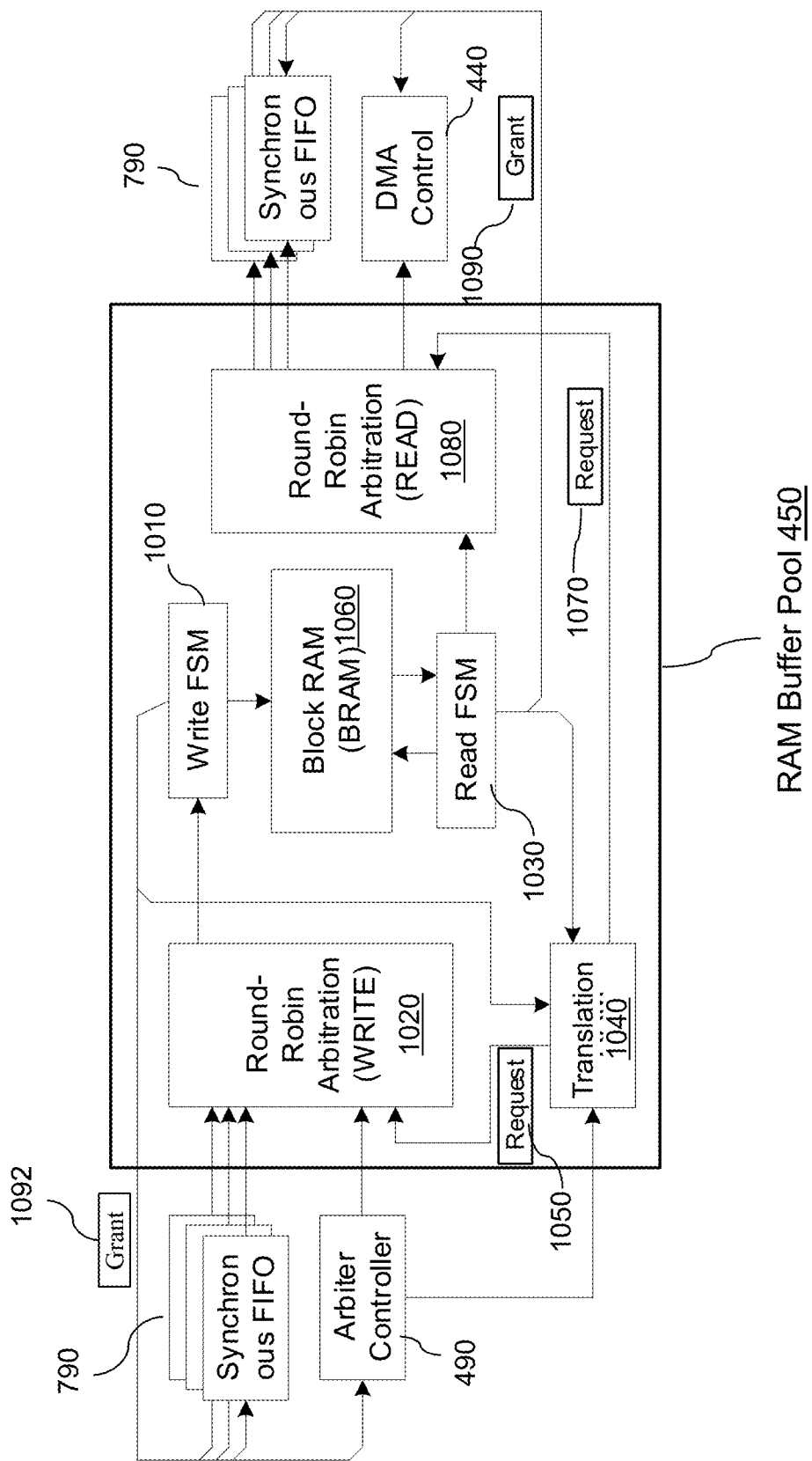
FIG. 10 is a schematic diagram depicting a RAM buffer pool of an SCI in an emulation system, according to some embodiments.

FIG. 10 is a schematic diagram depicting a RAM buffer pool 450 of an SCI in an emulation system, according to some embodiments.

The RAM buffer pool 450 may include a write FSM 1010, a round-robin arbitration 1020, a read FSM 1030, a translation 1040, a block RAM 1060, and a round-robin arbitration 1080 (for write). The translation 1040 may be configured to send a (translated) write request 1050 to the round-robin arbitration 1020 and/or send a (translated) read request 1070 to the round-robin arbitration 1080 (for read). The read FSM 1030 may be configured to issue a grant 1090 to cause a plurality of synchronous FIFOs 790 and the DMA control 440 to write data to the block RAM 1060. The write FSM 1010 may be configured to cause the plurality of synchronous FIFOs 790 and/or cause the arbiter controller 490 to read data from the block RAM 1060.

The RAM buffer pool 450 may implement a common buffer pool using 128 dual-port block RAMs (BRAM) with separate read and write ports. In some embodiments, each BRAM block is 4K bytes or 512×64 in size. For example, with a maximum of 256 transfers per 64-bit data bus (e.g., AXI burst and 64-bit data bus), the block RAMs 1060 may include 256 buffer units, each buffer unit being 2 KB in size to accommodate the burst of data. Each port may have its dedicated control FSM and access arbitration logic, e.g., the read FSM 1030 and the write FSM 1010 in FIG. 10. In some embodiments, each synchronous FIFO 790 may read data from the memory (block RAMs 1060) and write data into the memory. The arbiter controller 490 may move (or write) data from a buffer of the interconnect client interface 410 to the memory. DMA control 480 may fetch (or read) data from the memory and send them via a PCIe link to a BF ASIC (e.g., ASIC 206 in FIG. 2).

The translation 1040 may be configured to translate a request from the arbiter controller 490 into a common interface format before being forwarded to the round-robin arbitration 1020. For example, there may be 38 write requests from 38 SPI masters and other two write requests (e.g., from SPI client 420 and SPI interface 404), and the same number of read requests into the RAM buffer pool 450. The round-robin arbitration 1020 may perform a round-robin. In some embodiments, synchronous FIFOs 790 may be copied twice, one for write (to the round-robin arbitration 1020) and the other for read (to the round-robin arbitration 1080). That is, both requests may come from the same synchronous FIFOs 790 as shown in FIG. 10.

By granting a read request (1090), the RAM buffer pool 450 may assign a port (for read) to a target SPI master as long as it holds its request line. Similarly, by granting a write request (1092), the RAM buffer pool 450 may assign a port (for write) to a target SPI master as long as it holds its request line. Once the target finishes its read/write operations, it may clear its request line so that other target(s) with an active request can obtain its chance of service by the RAM buffer pool 450. In some embodiments, software can read any part of the memory by specifying in a register upper 4 bits of 20-bit memory address. For debug or memory test purposes, software can also write any part of the memory by enabling its write first in the register.

Figure 11:
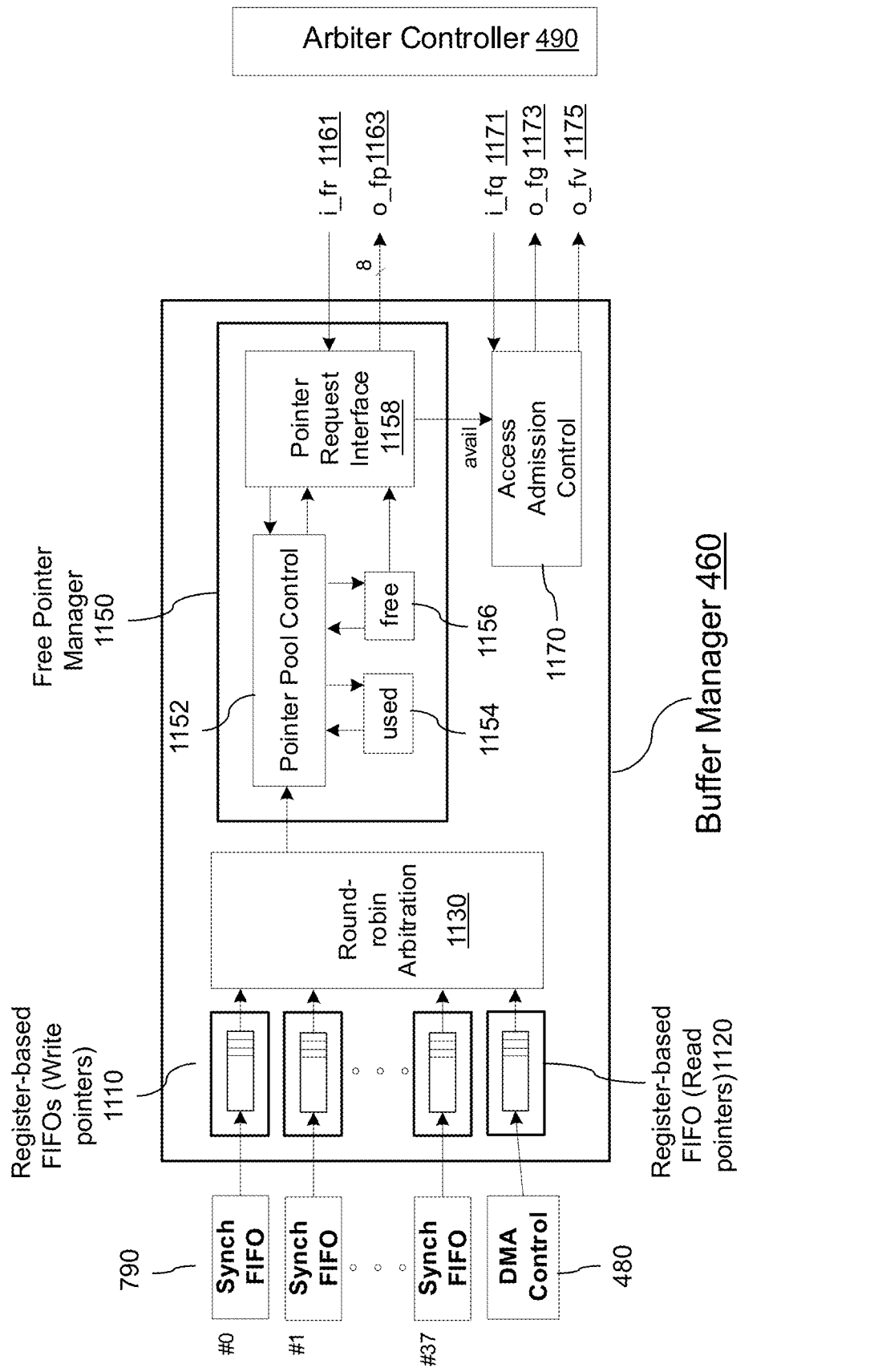
FIG. 11 is a schematic diagram depicting a buffer manager of an SCI in an emulation system, according to some embodiments.

FIG. 11 is a schematic diagram depicting a buffer manager 460 of an SCI in an emulation system, according to some embodiments. In some embodiments, the buffer manager 460 may maintain a list of buffer pointers (e.g., 256 buffer pointers) in a vector format, each of which is a base address of its corresponding buffer unit in the RAM buffer pool 450.

The buffer manager 460 may include a plurality of register-based FIFO queues 1110 connected to respective synchronous FIFOs 790 (e.g., 38 synchronous FIFOs as shown in FIG. 11). In some embodiments, each FIFO queue 1110 may include one or more write buffer pointers.

The buffer manager 460 may include a register-based FIFO 1120 connected to the DMA control 480. In some embodiments, each FIFO queue 1120 may include one or more read buffer pointers.

The buffer manager 460 may include a round-robin arbitration 1130, a free pointer manager 1150, and an access admission control (AAC) 1170. In some embodiments, the free pointer manager 1150 may include a pointer pool control 1152, a used counter 1154, a free counter 1156, and a pointer request interface 1158. In some embodiments, the pointer request interface 1158 may be connected to the arbiter controller 490 using lines i_fr 1161 and o_fp 1163. The access admission control 1170 may be connected to the arbiter controller 490 using lines i_fq 1171, o_fg 1173, and o_fv 1175.

The round-robin arbitration 1130 may scan or visit each of the buffers in a round-robin manner. Upon visiting a non-empty buffer, the round-robin arbitration 1130 may fetch a head-of-line pointer from the non-empty buffer and send the head-of-line pointer to the free pointer manager 1150 for deallocation (or return). Upon reset, the free pointer manager 1150 may initialize all pointers (e.g., 256 pointers) in a vector format. The free pointer manager 1150 may validate each returned pointer and flag an error if mismatch between allocation and de-allocation. The free pointer manager 1150 may include two counters: the used counter 1154 and the free counter 1156, to keep track of global pointer usage. Based on the counts from the counters, the free pointer manager 1150 may provide a signal "avail" to the access admission control 1170. The signal "avail" as being asserted may indicate that there is at least one free pointer in the buffer and its output (e.g., o_fp 1163) always indicates the current free pointer when avail=1.

When the buffer manager 460 receives a pointer request from the arbiter controller 490 with i_fq=1 (active), the AAC 1170 may check the avail signal status from the free pointer manager 1150. If free pointer(s) is available, the AAC 1170 may grant the request by asserting o_fg=1 and o_fv=1. The AAC 1170 may deny a request by asserting o_fv=1 but o_fg=0. When the arbiter controller 490 detects the grant signal, the arbiter controller 490 may latch the free pointer output from the free pointer manager 1150, e.g., o_fp[7:0], and send a signal, i_fr=1, to update the free pointer manager 1150.

Only client devices destined accesses via the synchronous FIFO except for non-DMA read may need buffer allocation and use of pointers in some embodiments. The arbiter controller 490 may direct requests among different targets based on a memory map. For target client devices, the arbiter controller 490 may also forward target-specific DMA mode settings with the request.

A write data flow for writes destined for a SPI master is described hereinbelow. When any one of SPI client 420 or non-SPI interface 402 issues a valid write request, the request may go through the interconnect 470, the interconnect client interface 410 then arrive at the arbiter controller 490. Upon receiving a write request, the arbiter controller 490 may first decode the address to identify the target, for example, SPI master <n> for n=0, 1, . . . , 37. The arbiter controller 490 may also send a request to the buffer manager 460 for a free (write) pointer. When the buffer manager 460 grants the request, the arbiter controller 490 may latch the pointer, generate a write request to the RAM buffer pool 450 and wait for its grant signal back. After granted by the RAM buffer pool 450, the arbiter controller 490 may initiate a data transfer from the data buffer associated with the interconnect client interface 410 into the newly allocated buffer unit starting at the write pointer. Once this transfer is completed, the arbiter controller 490 may generate a write request to SPI master <n> by compiling its full 32-bit address from its page control register (as upper 16 bits) and current input address from the interconnect client interface 410 (as lower 16 bits), together with the write burst length and write pointer. As described above, once the synchronous FIFO 790 has copied all write data from the RAM buffer pool 450 to the WSCTL buffer 782, the write pointer may become obsolete and the synchronous FIFO 790 may return it to the buffer manager 460 for reuse.

Figure 12:
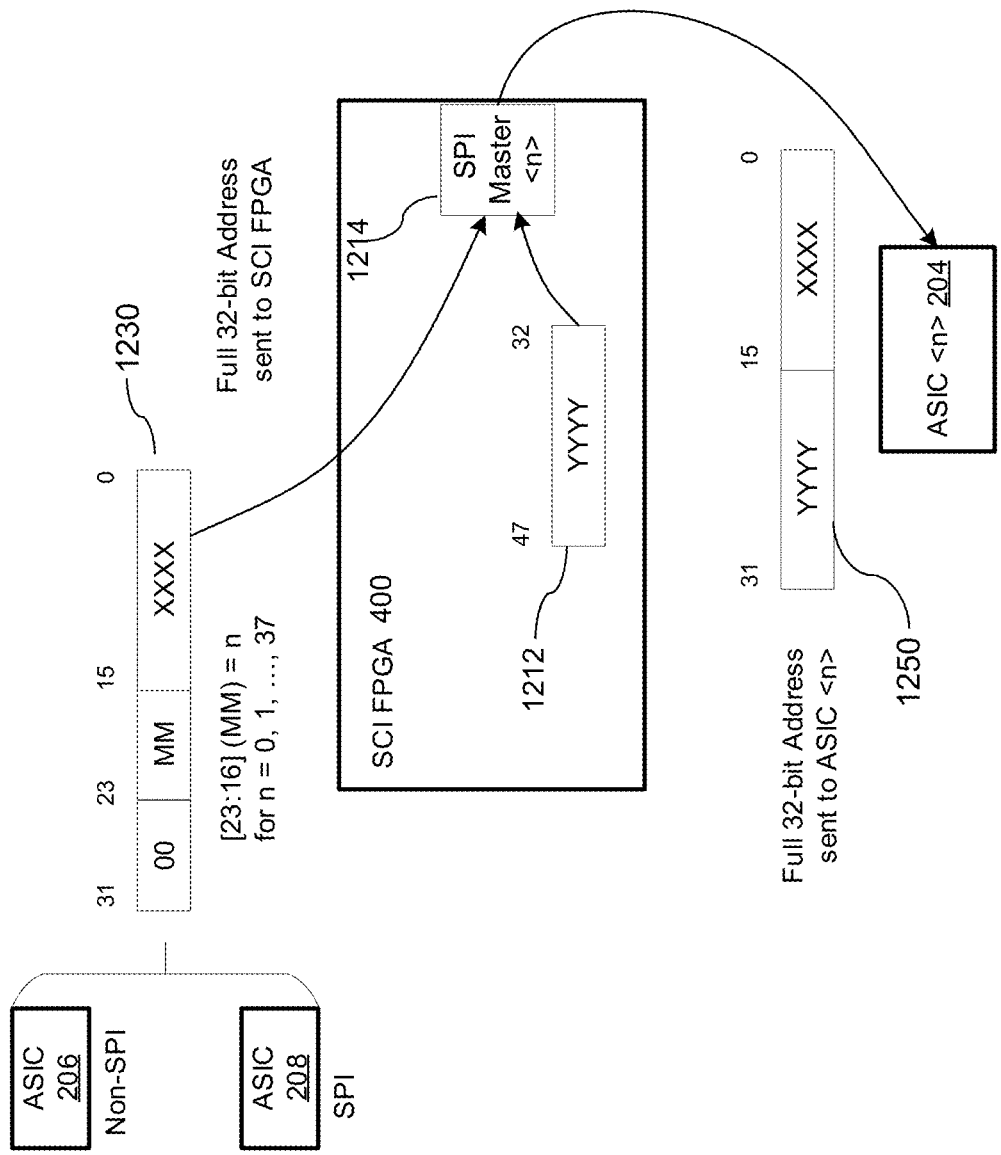
FIG. 12 is a block diagram depicting an SCI FPGA in an emulation system, according to some embodiments.

FIG. 12 is a block diagram depicting an SCI FPGA in an emulation system, according to some embodiments.

A read data flow for reads destined for a SPI master is described hereinbelow. When any one of SPI client 420 or non-SPI interface 402 issues a valid read request, it will go through the interconnect 470, the interconnect client interface 410 then arrive at the arbiter controller 490. Upon receiving a read request, the arbiter controller 490 may first decode the address to identify the target, for example, SPI master <n> for n=0, 1, . . . , 37. Associated with each SPI master, there may be a configuration register bit for DMA enable/disable control. If this is a non-DMA request, the arbiter controller 490 may simply send a read request to the SPI master and wait for its completion, e.g., when the interconnect client interface 410 clears its request output. If this is a DMA read request, the arbiter controller 490 may send a request to the buffer manager 460 for a free (read) pointer. When the buffer manager 460 grants the request, the arbiter controller 490 may latch the pointer, generate a read request to SPI master <n> by compiling its full 32-bit address from its page control register (as upper 16 bits) and current input address from the interconnect client interface 410 (as lower 16 bits), together with the read burst length and read pointer.

FIG. 12 shows this client device addressing via the SCI FPGA 400. For example, when the buffer manager 460 grants the request, the arbiter controller 490 may latch the pointer, generate a read request to SPI master <n> (1214 in FIG. 12) by compiling its full 32-bit address 1250 from its page control register 1212 (as upper 16 bits) and current input address 1230 from the interconnect client interface 410 (as lower 16 bits), together with the read burst length and read pointer. Once the synchronous FIFO 790 has collected all the read data in its buffer, it will move them to the allocated buffer unit in the RAM buffer pool 450 using the read pointer. When all data saved in the memory, the synchronous FIFO 790 may generate a DMA transfer request with data size and pointer to the DMA control 480. The DMA control 480 may fetch data from the memory and send them to the BF ASIC (e.g., ASIC 206 in FIG. 2) via the non-SPI interface 402. Once the transfer is done, the read pointer may become obsolete and the DMA control 480 may return it to the buffer manager 460 for reuse.

Referring to FIG. 12, the element 1212 may be a DMA configuration register (e.g., DMA_CFG register). An external client (e.g., ASIC<n> in FIGS. 2 and 12; n=0, . . . , 37) may need 28-bit address and thus 34-bit SPI addressing may be performed as shown in FIG. 12. A memory map of the SCI FPGA 400 may support lower 16 bits only for each client; and thus, paging may be provided via the DMA configuration register 1212. Software may set a 32-bit SPI address 1250 of ASIC<n> 204 by combining (1) lower 16 bits of the input address 1230 of ASIC<n> 204 ("XXXX" in FIG. 12) and (2) a value stored in the DMA configuration register 1212 as upper 16 bits ("YYYY" in FIG. 12).

Figure 13A:
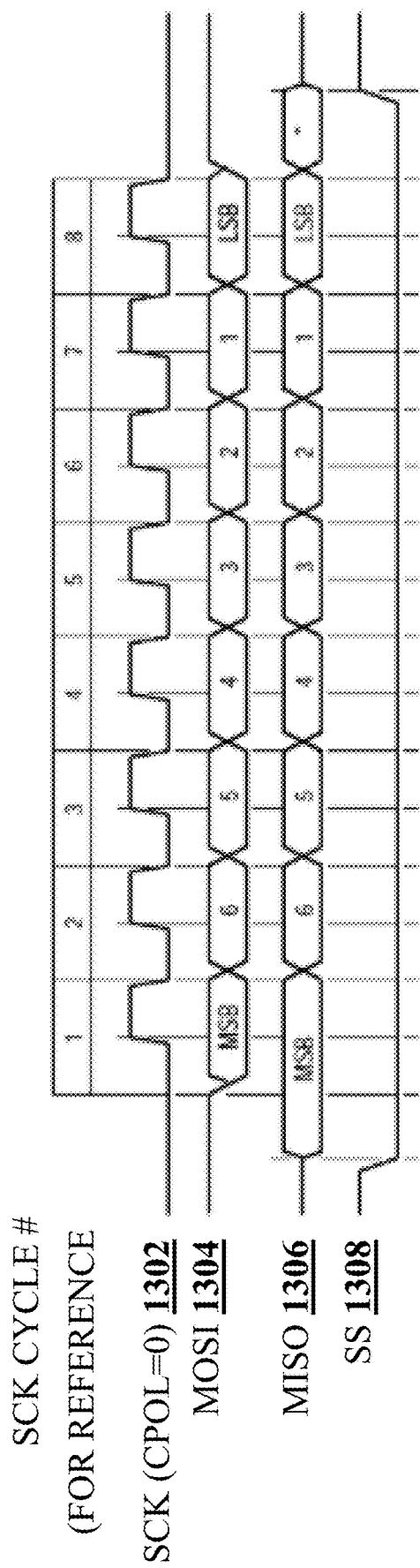
FIG. 13A shows timings of signals between a SPI master and a SPI client based upon a communication protocol, according to some embodiments.

FIG. 13A shows timings of signals between a SPI master and a SPI client based upon a communication protocol, according to some embodiments. FIG. 13A shows timings of signals between a SPI master for a master device (for example, FGPA, ASIC, etc.) and a SPI client for a client device (for example, FGPA, ASIC, etc.) of an emulation system. The SPI master may be connected to the SPI client using SCK 1302, MOSI 1304, MISO 1306, and SS 1308 lines. The SCK 1302, MOSI 1304, and MISO 1306 signals may be shared by one or more SPI clients while each SPI client may have a unique SS 1308 line.

The SCK 1302 line may be a control line driven by the SPI master to regulate a flow of data bits. The MOSI 1304 line may be a communication line, which may supply output data from the SPI master to an input of the SPI client. The MISO 1306 line may be a communication line, which may supply output data from the SPI client to an input of the SPI master. The SS 1308 line may be a control line, which may allow the SPI client to be turned ON and OFF by the SPI master.

For both the SPI master and the SPI client, output data may be toggled at a falling edge of the SCK 1302 and input data may be sampled at a rising edge of the SCK 1302. So, in an ideal situation, the input data may have a half cycle of setup time window when there is a 50% SCK 1302 duty cycle. In reality, the SCK 1302 may have duty cycle distortion. The SCK 1302 duty cycle may get changed due to other factors, such as device output delay, propagation delay, device input delay, etc.

When the SCK 1302 may have duty cycle distortion, the device's output to pad delays may take an order of a few nanoseconds as a result of their drive strength and output loading. All of these factors may add up and increase a round-trip delay, and thus making a first bit of the SPI client response slip past its sampling edge perceived by the SPI master. In order to mitigate this problem associated with the round-trip delay, a training processor may adjust output delay setting of the SPI client and input delay setting of the SPI master.

The SPI client may provide adjustments of its output delay setting, which may allow time-shift of its response frame start position. For instance, left-shifting (earlier time) the output may counter-act the slipping effects. When the adjustment of the output delay setting of the SPI client is not enough, the SPI master may provide cycle-based adjustment of its input delay setting. During this adjustment process, the training processor may use bit patterns from a training response instruction received from the SPI client during link training, which are "10001101 . . . ". By searching for a first bit (=1) of the response from the SPI client during the link training process, the SPI master may measure its latency relative to expected position from the SPI master timing sequence. By observing this measurement, the training processor may select a delayed sampling position for a first bit from a register, which may provide up to 8 bit clock positions for delayed sampling. Using the adjustment of the output delay setting of the SPI client and the input delay setting of the SPI master, the SPI master may determine an optimal bit position to sample-and-capture the response of the SPI client.

In the example shown in the FIG. 6, a transaction may begin between the SPI master and the SPI client when the SS 1308 line may be driven to logic low. A relationship between the SS 1308, the SCK 1302, and transaction data may depend on how clock polarity (CPOL) and clock phase (CPHA) are configured. The SPI master may configure the CPOL and the CPHA with respect to the data. CPOL may determine a polarity of the SCK 1302. CPHA may determine a time (for example, a phase) of data bits relative to the SCK 1302 pulses. In this example, the CPOL and the CPHA are specified as '0'. CPOL=0 is the SCK 1302 which idles at 0, and each cycle includes a pulse of 1. CPHA=0 cycle consists of a half cycle with the SCK 1302 idle, followed by a half cycle with the SCK 1302 asserted.

The SCK 1302 has eight cycles. Within the SCK 1302: (i) 1 may indicate a first cycle of the SCK 1302, (ii) 2 may indicate a second cycle of the SCK 1302, (iii) 3 may indicate a third cycle of the SCK 1302, (iv) 4 may indicate a fourth cycle of the SCK 1302, (v) 5 may indicate a fifth cycle of the SCK 1302, (vi) 6 may indicate a sixth cycle of the SCK 1302, (vii) 7 may indicate a seventh cycle of the SCK 1302, and (vii) 8 may indicate a last cycle of the SCK 1302. The SPI master may output the data via the MOSI 1304 line on a trailing edge of a preceding SCK 1302 cycle, while the SPI client may capture the data on a leading edge of the SCK 1302 cycle. The SPI master may hold the data valid until the trailing edge of the current SCK 1302 cycle.

Figure 13B:
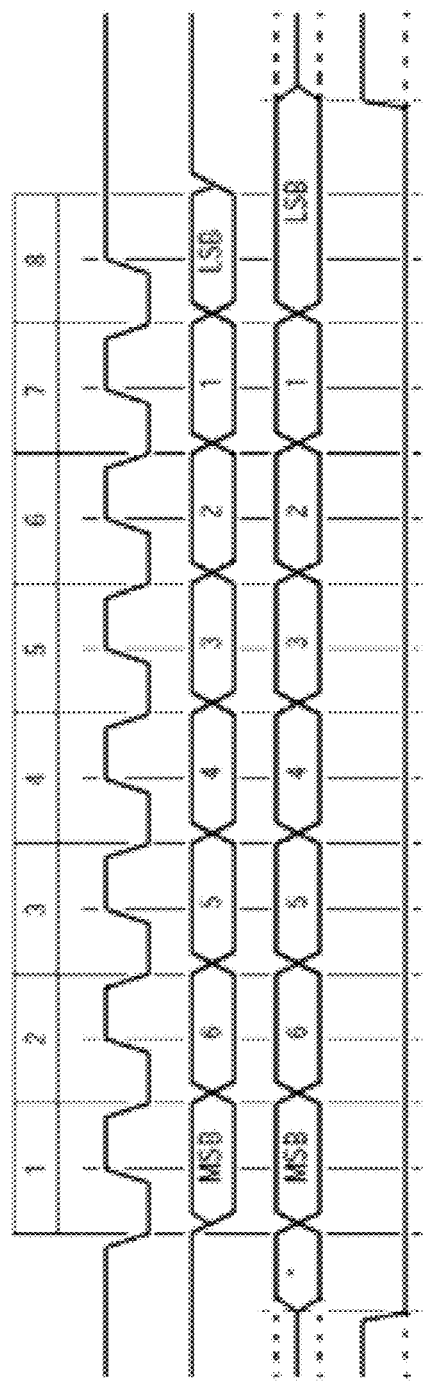
FIG. 13B shows timings of signals between a SPI master and a SPI client based upon a communication protocol, according to some embodiments.

FIG. 13B shows timings of signals between a SPI master and a SPI client based upon a communication protocol, according to some embodiments. FIG. 13B shows timings of signals between a SPI master for a master device (for example, FGPA, ASIC, etc.) and a SPI client for a client device (for example, FGPA, ASIC, etc.). FIG. 13B will be explained in conjunction with the signals of FIG. 13A. The SPI master may be connected to the SPI client using SCK 1352, MOSI 1354, MISO 1356, and SS 1358 lines. The SCK 1352, MOSI 1354, and MISO 1356 signals may be shared by one or more SPI clients while each SPI client may have a unique SS 1358 line.

The SCK 1352 line may be a control line driven by the SPI master to regulate a flow of data bits. The MOSI 1354 line may be a communication line, which may supply output data from the SPI master to an input of the SPI client. The MISO 1356 line may be a communication line, which may supply output data from the SPI client to an input of the SPI master. The SS 1358 line may be a control line, which may allow the SPI client to be turned on and off by the SPI master.

In the example shown in the FIG. 13B, a transaction may begin between the SPI master and the SPI client when the SS 1358 line may be driven to logic low. In this example, the CPOL and the CPHA are specified as '1. CPOL=1 is the SCK 1352 which idles at 1, and each cycle includes a pulse of 0. CPHA=1 cycle consists of a half cycle with the SCK 1352 asserted, followed by a half cycle with the SCK 1352 idle. The SPI master may output the data via the MOSI 1354 line on a leading edge of a current SCK 1352 cycle, while the SPI client may capture the data on a trailing edge of the SCK 1352 cycle. The SPI master may hold the data valid until the leading edge of the following SCK 1352 cycle.

Figure 14:
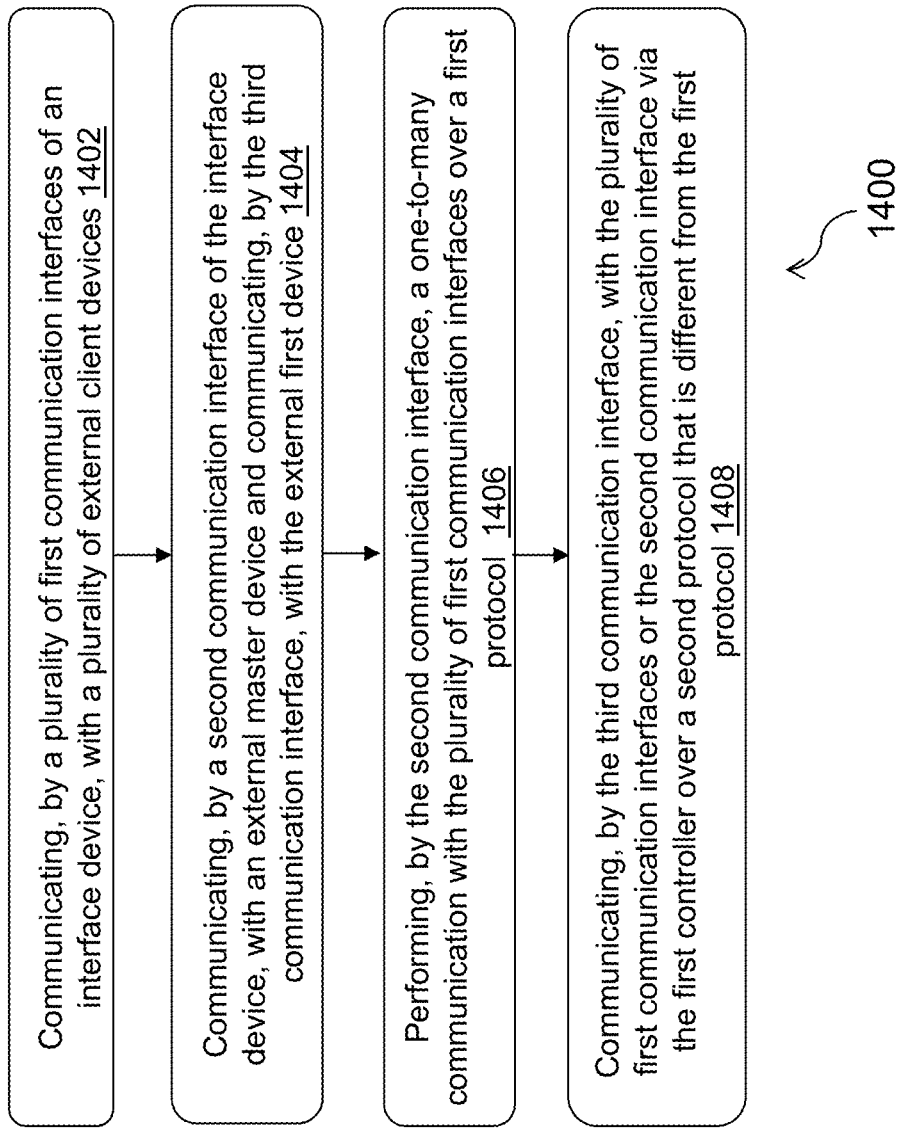
FIG. 14 is a flowchart illustrating an example methodology for communicating between an external SPI master device, a plurality of external SPI client devices, and an external non-SPI device via an interface device, according to some embodiments.

FIG. 14 shows execution steps for communicating between an external SPI master device, a plurality of external SPI client devices, and an external non-SPI device via an interface device, according to a method 1400. The method 1400 may include execution steps 1402, 1404, 1406, and 1408 performed in an emulation system (e.g., emulation system 102 in FIG. 1) including an interface device (e.g., SCI 300 in FIG. 3; SCI 400 in FIG. 4). The interface device may include a plurality of first communication interfaces (e.g., SPI masters 303-1 to 303-N in FIG. 3; SPI masters 430-1 to 430-N in FIG. 4), a second communication interface (e.g., SPI client 301 in FIG. 3; SPI client 470 in FIG. 4), a third communication interface (e.g., non-SPI interface 302 in FIG. 3; non-SPI interface 402 in FIG. 4), and a first controller (e.g., controller 305 in FIG. 3; arbiter controller 490 in FIG. 4; RAM buffer pool 450 in FIGS. 4 and 10; buffer manager 460). It should be understood that the steps described herein are merely illustrative and additional or substitute steps should also be considered to be within the scope of this disclosure. Furthermore, methods with a fewer numbers of steps should also be considered to be within the scope of this disclosure.

At step 1402, the plurality of first communication interfaces (e.g., SPI masters 303-1 to 303-N in FIG. 3; SPI masters 430-1 to 430-N in FIG. 4) may communicate with a plurality of external client devices (e.g., ASICs 204-1 to 204-N client devices in FIG. 2; client devices 330-1 to 330-N in FIG. 3).

At step 1404, the second communication interface (e.g., SPI client 301 in FIG. 3; SPI client 470 in FIG. 4) may communicate with an external master device (e.g., ASIC 208 in FIG. 2; master device 310 in FIG. 3). The third communication interface (e.g., non-SPI interface 302 in FIG. 3; non-SPI interface 402 in FIG. 4) may communicate with an external first device (e.g., ASIC 206 in FIG. 2; non-SPI controller 320 in FIG. 3)

At step 1406, the second communication interface (e.g., SPI client 301 in FIG. 3; SPI client 470 in FIG. 4) may perform a one-to-many communication with the plurality of first communication interfaces (e.g., SPI masters 303-1 to 303-N in FIG. 3; SPI masters 430-1 to 430-N in FIG. 4) over a first protocol. In some embodiments, the first protocol may be an SPI protocol.

At step 1408, the third communication interface (e.g., non-SPI interface 302 in FIG. 3; non-SPI interface 402 in FIG. 4) may communicate with the plurality of first communication interfaces (e.g., SPI masters 303-1 to 303-N in FIG. 3; SPI masters 430-1 to 430-N in FIG. 4) or the second communication interface (e.g., SPI client 301 in FIG. 3; SPI client 470 in FIG. 4) via the first controller over a second protocol that is different from the first protocol. In some embodiments, the second protocol may be PCIe or SDIO.

In some embodiments, at least one of the plurality of first communication interfaces (one of SPI masters 430-1 to 430-N in FIGS. 4 and 7) may communicate with the third communication interface (e.g., non-SPI interface 402 in FIG. 4) by performing burst read from the third communication interface using a burst read buffer of the at least one first communication interface (e.g., buffer 787 in FIG. 7) and performing burst write to the at least one first communication interface using a burst write buffer of the at least one first communication interface (e.g., buffer 782 in FIG. 7). In some embodiments, the at least one first communication interface (e.g., burst read interface controller 785 of the SPI master 430 in FIG. 7) may buffer and pipeline burst read transactions using the burst read buffer. The at least one first communication interface (e.g., burst write interface controller 780 of the SPI master 430 in FIG. 7) may buffer and pipeline burst write transactions using the burst write buffer.

The first controller (e.g., RAM buffer pool 450 in FIGS. 4 and 10) may convert a read/write request received from one of the second communication interface or the third communication interface into an internal bus format (e.g., read/write requests 1050, 1070 converted by the translation 1040 in FIG. 10). The first controller (e.g., round-robin arbitration (WRITE) 1020 and round-robin arbitration (READ) 1080 of RAM buffer pool 450 in FIG. 10; round-robin arbitration 1130 of buffer manager 460 in FIG. 11) may arbitrate accesses between the plurality of first communication interfaces, the second communication interface, and the third communication interface. In some embodiments, the first controller (e.g., buffer manager 460 in FIGS. 4 and 11) may include at least one read/write buffer (e.g., register-based FIFOs 1110 and register-based FIFO 1120 in FIG. 11) configured to perform queuing and flow control per first communication interface (e.g., via synchronous FIFO 790 per SPI master; see FIGS. 7 and 11).

The plurality of first communication interfaces may be configured to send a read/write request to at least one of the second communication interface or the third communication interface, bypassing the first controller. For example, by enabling DMA mode (using DMA control 480), PCIe interfaces (e.g., non-SPI interface 402 in FIG. 4) may post accesses to an external device bypassing arbitration logics (e.g., arbitration logics implemented by arbiter controller 490, buffer manager 460, RAM buffer pool 450) such that the initiator does not need to wait for explicit acknowledgement from its target to complete a transaction. At least one of the plurality of first communication interfaces may include a debug access controller (e.g., debug access interface controller 760 in FIG. 7). In some embodiments, at least one of the plurality of first communication interfaces may communicate with the second communication interface using a debug access controller. For example, as shown in FIG. 7, the debug access interface controller 760 may perform a back-door read/write (single access) to the SPI client 420. The debug access interface controller (or debug access controller) may be connected to an internal control bus (e.g., control bus between register access 440, arbiter controller, SPI client, SPI masters, and non-SPI client; see FIGS. 6, 7 and 9), thereby allowing both external SPI master device and external non-CSPI controller to not only send single read/write request bypassing a central arbiter, but also run native SPI instructions over the associated SPI link.

Each of the plurality of first communication interfaces, the second communication interface, and the third communication interface may include a respective control and status register. The plurality of first communication interfaces, the second communication interface, and the third communication interface may access a control and status register of each other via the first controller. For example, the second communication interface (e.g., SPI client 420 in FIG. 6) may have a control and status register (e.g., registers 650 in FIG. 6), a first communication interface (e.g., SPI master 430 in FIG. 7) may have a control and status register (e.g., registers 740 in FIG. 7), and the third communication interface (e.g., non-SPI interface 402 in FIG. 4) may have a control and status register (not shown). As shown in FIG. 9, the plurality of first communication interfaces (e.g., SPI masters 430), the second communication interface (e.g., SPI client 420), and the third communication interface (e.g., non-SPI client 402) may access a control and status register of each other via the first controller (e.g., arbiter controller 490 and register access 440).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
   a plurality of first communication interfaces configured to communicate with a plurality of external client devices;
   a second communication interface configured to communicate with an external master device;
   a third communication interface configured to communicate with an external first device; and
   a first controller, wherein:
   the second communication interface is configured to perform a one-to-many communication with the plurality of first communication interfaces over a first protocol, and
   the third communication interface is configured to communicate with the plurality of first communication interfaces or the second communication interface via the first controller over a second protocol that is different from the first protocol.

2. The system of claim 1, wherein the first protocol is a serial peripheral interface (SPI) protocol.

3. The device of claim 1, wherein the second protocol is PCI Express (Peripheral Component Interconnect Express) or Secure Digital Input Output (SDIO).

4. The device of claim 1, wherein at least one of the plurality of first communication interfaces comprises:
   a burst read buffer dedicated for performing burst read from the third communication interface by the at least one first communication interface,
   a burst write buffer dedicated for burst write to the at least one first communication interface by the third communication interface,
   a burst read interface controller configured to buffer and pipeline burst read transactions using the burst read buffer, and
   a burst write interface controller configured to buffer and pipeline burst write transactions using the burst write buffer.

5. The system of claim 1, wherein the first controller is configured to convert a read/write request received from one of the second communication interface or the third communication interface into an internal bus format.

6. The system of claim 1, wherein the first controller comprises at least one read/write buffer configured to perform queuing and flow control per first communication interface.

7. The system of claim 1, wherein the first controller is configured to arbitrate accesses between the plurality of first communication interfaces, the second communication interface, and the third communication interface.

8. The system of claim 1, wherein the plurality of first communication interfaces are configured to send a read/write request to at least one of the second communication interface or the third communication interface, bypassing the first controller.

9. The system of claim 1, wherein at least one of the plurality of first communication interfaces comprises a debug access controller.

10. The system of claim 1, wherein each of the plurality of first communication interfaces, the second communication interface, and the third communication interface includes a respective control and status register, and
wherein the plurality of first communication interfaces, the second communication interface, and the third communication interface are configured to access a control and status register of each other via the first controller.

11. A method comprising:
communicating, by a plurality of first communication interfaces of an interface device, with a plurality of external client devices;
communicating, by a second communication interface of the interface device, with the external master device;
communicating, by a third communication interface of the interface device, with an external first device; and
performing, by the second communication interface, a one-to-many communication with the plurality of first communication interfaces over a first protocol; and
communicating, by the third communication interface, with the plurality of first communication interfaces or the second communication interface via the first controller over a second protocol that is different from the first protocol.

12. The method of claim 11, wherein the first protocol is a serial peripheral interface (SPI) protocol.

13. The method of claim 11, wherein the second protocol is PCI Express (Peripheral Component Interconnect Express) or Secure Digital Input Output (SDIO).

14. The method of claim 11, further comprising:
communicating, by at least one of the plurality of first communication interfaces, with the third communication interface by:
performing burst read from the third communication interface using a burst read buffer of the at least one first communication interface;
performing burst write to the at least one first communication interface using a burst write buffer of the at least one first communication interface;
buffering and pipelining burst read transactions using the burst read buffer; and
buffering and pipelining burst write transactions using the burst write buffer.

15. The method of claim 11, further comprising:
converting, by the first controller, a read/write request received from one of the second communication interface or the third communication interface into an internal bus format.

16. The method of claim 11, further comprising:
performing, by at least one read/write buffer of the first controller, queuing and flow control per first communication interface.

17. The method of claim 11, further comprising:
arbitrating, by the first controller, accesses between the plurality of first communication interfaces, the second communication interface, and the third communication interface.

18. The method of claim 11, further comprising:
sending, by the plurality of first communication interfaces, a read/write request to at least one of the second communication interface or the third communication interface, bypassing the first controller.

19. The method of claim 11, further comprising:
communicating, by at least one of the plurality of first communication interfaces, with the second communication interface using a debug access controller.

20. The method of claim 11, wherein
each of the plurality of first communication interfaces, the second communication interface, and the third communication interface includes a respective control and status register, and
the method further comprises accessing, by the plurality of first communication interfaces, the second communication interface, and the third communication interface, a control and status register of each other via the first controller.

* * * * *